United States Patent
Yu et al.

(10) Patent No.: US 9,511,330 B2
(45) Date of Patent: Dec. 6, 2016

(54) FIBRILLATED FIBERS FOR LIQUID FILTRATION MEDIA

(71) Applicant: Hollingsworth & Vose Company, East Walpole, MA (US)

(72) Inventors: Howard Yu, Belmont, MA (US); Sneha Swaminathan, Nashua, NH (US)

(73) Assignee: Hollingsworth & Vose Company, East Walpole, MA (US)

( * ) Notice: Subject to any disclaimer, the term of this patent is extended or adjusted under 35 U.S.C. 154(b) by 185 days.

(21) Appl. No.: 14/135,187

(22) Filed: Dec. 19, 2013

(65) Prior Publication Data

US 2014/0224727 A1 Aug. 14, 2014

Related U.S. Application Data

(63) Continuation-in-part of application No. 13/528,774, filed on Jun. 20, 2012.

(51) Int. Cl.
| | | |
|---|---|---|
| *B01D 39/18* | (2006.01) | |
| *B01D 39/16* | (2006.01) | |
| *B01D 39/20* | (2006.01) | |
| *B01D 24/00* | (2006.01) | |
| *B01D 71/10* | (2006.01) | |

(52) U.S. Cl.
CPC ........... *B01D 71/10* (2013.01); *B01D 39/1623* (2013.01); *B01D 39/2017* (2013.01); *B01D 2239/065* (2013.01)

(58) Field of Classification Search
CPC ................. B01D 2239/025; B01D 2239/0654; B01D 39/1623; B01D 39/18; B01D 39/2017; B01D 2239/065; B01D 39/00; B01D 46/10; B01D 2239/0208; B01D 2239/0618; C02F 1/004; B01J 20/28004; B01J 20/28023

See application file for complete search history.

(56) References Cited

U.S. PATENT DOCUMENTS 3,083,118 A 3/1963 Bridgeford
3,290,207 A 12/1966 Magat et al.
(Continued)

FOREIGN PATENT DOCUMENTS

CN 101081309 A 12/2007
CN 101380535 A 3/2009
(Continued)

OTHER PUBLICATIONS

International Search Report and Written Opinion for PCT/US2011/065484 mailed Apr. 20, 2012.
(Continued)

*Primary Examiner* — Ana M. Fortuna
(74) *Attorney, Agent, or Firm* — Wolf, Greenfield & Sacks, P.C.

(57) ABSTRACT

Fiber webs which are used in filter media are described herein. In some embodiments, the fiber webs include fibrillated fibers and optionally non-fibrillated fibers, amongst other optional components (e.g., binder resin). In some embodiments, the fiber webs include limited amounts of, or no, glass fiber. The respective characteristics and amounts of the fibrillated fibers are selected to impart desirable properties including mechanical properties and filtration properties (e.g., dust holding capacity and efficiency), amongst other benefits.

22 Claims, 1 Drawing Sheet

(56) References Cited

U.S. PATENT DOCUMENTS

| | | | |
|---|---|---|---|
| 3,441,515 A | 4/1969 | Oshida et al. | |
| 3,865,732 A | 2/1975 | Terhune et al. | |
| 4,639,513 A | 1/1987 | Hou et al. | |
| 5,192,604 A * | 3/1993 | Giglia | A41D 31/0011 128/206.12 |
| 5,196,470 A | 3/1993 | Anderson et al. | |
| 5,366,832 A | 11/1994 | Hayashi et al. | |
| 5,580,459 A | 12/1996 | Powers et al. | |
| 5,597,645 A | 1/1997 | Pike et al. | |
| 5,672,399 A | 9/1997 | Kahlbaugh et al. | |
| 5,725,821 A | 3/1998 | Gannon et al. | |
| 5,731,080 A | 3/1998 | Cousin et al. | |
| 5,785,725 A | 7/1998 | Cusick et al. | |
| 5,958,320 A | 9/1999 | Pitowski et al. | |
| 5,983,469 A | 11/1999 | Beaty et al. | |
| 5,997,618 A | 12/1999 | Schneider et al. | |
| 6,001,639 A | 12/1999 | Schulein et al. | |
| 6,042,769 A | 3/2000 | Gannon et al. | |
| 6,159,601 A | 12/2000 | Pitowski et al. | |
| 6,171,684 B1 | 1/2001 | Kahlbaugh et al. | |
| 6,221,487 B1 | 4/2001 | Luo et al. | |
| 6,235,392 B1 | 5/2001 | Luo et al. | |
| 6,387,690 B1 | 5/2002 | Schulein et al. | |
| 6,419,839 B1 | 7/2002 | Cox et al. | |
| 6,511,930 B1 | 1/2003 | Luo et al. | |
| 6,596,033 B1 | 7/2003 | Luo et al. | |
| 6,660,172 B2 | 12/2003 | Koslow | |
| 6,692,827 B2 | 2/2004 | Luo et al. | |
| 6,706,876 B2 | 3/2004 | Luo et al. | |
| 6,855,531 B2 | 2/2005 | Shulein et al. | |
| 6,872,311 B2 | 3/2005 | Koslow | |
| 6,939,492 B2 | 9/2005 | Jackson et al. | |
| 7,008,465 B2 | 3/2006 | Graham et al. | |
| 7,052,532 B1 * | 5/2006 | Liu | B01D 39/2075 55/520 |
| 7,137,510 B1 | 11/2006 | Klein et al. | |
| 7,214,727 B2 | 5/2007 | Kwon et al. | |
| 7,226,773 B2 | 6/2007 | Schulein et al. | |
| 7,228,973 B2 | 6/2007 | Simon | |
| 7,244,497 B2 | 7/2007 | Hartmann et al. | |
| 7,296,691 B2 | 11/2007 | Koslow | |
| 7,314,497 B2 | 1/2008 | Kahlbaugh et al. | |
| 7,390,343 B2 | 6/2008 | Tepper et al. | |
| 7,445,737 B2 | 11/2008 | Sanderson et al. | |
| 7,534,379 B2 | 5/2009 | Ellison et al. | |
| 7,534,380 B2 | 5/2009 | Ellison et al. | |
| 7,655,112 B2 | 2/2010 | Koslow | |
| 7,670,678 B2 | 3/2010 | Phan | |
| 8,012,312 B2 | 9/2011 | Goto et al. | |
| 8,833,567 B2 * | 9/2014 | Stanfel | B01D 39/1623 210/435 |
| 8,882,876 B2 | 11/2014 | Battenfeld et al. | |
| 9,027,765 B2 | 5/2015 | Battenfeld et al. | |
| 2002/0037407 A1 | 3/2002 | Luo et al. | |
| 2002/0187701 A1 | 12/2002 | Healey | |
| 2003/0054539 A1 | 3/2003 | Schulein et al. | |
| 2003/0141261 A1 | 7/2003 | Koslow | |
| 2003/0168401 A1 | 9/2003 | Koslow | |
| 2003/0177909 A1 | 9/2003 | Koslow | |
| 2004/0043243 A1 | 3/2004 | Chen et al. | |
| 2004/0178142 A1 | 9/2004 | Koslow | |
| 2004/0232067 A1 | 11/2004 | Simon | |
| 2005/0011827 A1 | 1/2005 | Koslow | |
| 2005/0051487 A1 | 3/2005 | Koslow | |
| 2005/0070003 A1 | 3/2005 | Schulein et al. | |
| 2005/0142973 A1 | 6/2005 | Bletsos et al. | |
| 2005/0216075 A1 | 9/2005 | Wang et al. | |
| 2006/0102871 A1 | 5/2006 | Wang et al. | |
| 2006/0134411 A1 | 6/2006 | Mackey et al. | |
| 2006/0249705 A1 | 11/2006 | Wang et al. | |
| 2007/0017075 A1 | 1/2007 | Nguyen | |
| 2007/0017076 A1 | 1/2007 | Nguyen et al. | |
| 2007/0039300 A1 | 2/2007 | Kahlbaugh et al. | |
| 2007/0154510 A1 | 7/2007 | Wilcher et al. | |
| 2007/0232178 A1 | 10/2007 | Polat et al. | |
| 2007/0232179 A1 | 10/2007 | Polat et al. | |
| 2007/0251624 A1 | 11/2007 | Han et al. | |
| 2007/0266503 A1 | 11/2007 | Schmidt-Forst et al. | |
| 2008/0020205 A1 | 1/2008 | Fink et al. | |
| 2008/0022645 A1 | 1/2008 | Skirius et al. | |
| 2008/0105626 A1 | 5/2008 | Jones et al. | |
| 2008/0131471 A1 | 6/2008 | Kolbe et al. | |
| 2008/0149561 A1 | 6/2008 | Chu et al. | |
| 2008/0154225 A1 | 6/2008 | Phan | |
| 2008/0241536 A1 | 10/2008 | Luo et al. | |
| 2009/0004473 A1 | 1/2009 | Luo | |
| 2009/0022960 A1 | 1/2009 | Suer et al. | |
| 2009/0022983 A1 | 1/2009 | Cabell et al. | |
| 2009/0025894 A1 | 1/2009 | Barnholtz et al. | |
| 2009/0042475 A1 | 2/2009 | Pourdeyhimi | |
| 2009/0050578 A1 | 2/2009 | Israel et al. | |
| 2009/0078640 A1 | 3/2009 | Chu et al. | |
| 2009/0087475 A1 | 4/2009 | Sheehan | |
| 2009/0123525 A1 | 5/2009 | Bedard | |
| 2009/0165969 A1 | 7/2009 | Luo | |
| 2009/0218056 A1 | 9/2009 | Manifold et al. | |
| 2009/0218057 A1 | 9/2009 | Manifold et al. | |
| 2009/0218058 A1 | 9/2009 | Manifold et al. | |
| 2009/0218063 A1 | 9/2009 | Manifold et al. | |
| 2009/0220731 A1 | 9/2009 | Manifold et al. | |
| 2009/0220741 A1 | 9/2009 | Manifold et al. | |
| 2009/0220769 A1 | 9/2009 | Manifold et al. | |
| 2009/0227975 A1 | 9/2009 | Dougherty et al. | |
| 2009/0232920 A1 | 9/2009 | Lozano et al. | |
| 2009/0246447 A1 | 10/2009 | Luo | |
| 2009/0269429 A1 | 10/2009 | Lozano et al. | |
| 2009/0321028 A1 | 12/2009 | Takaoka et al. | |
| 2009/0324926 A1 | 12/2009 | Luo | |
| 2010/0044289 A1 | 2/2010 | Koslow | |
| 2010/0065236 A1 | 3/2010 | Henriksson et al. | |
| 2010/0187171 A1 | 7/2010 | Gupta | |
| 2010/0252426 A1 | 10/2010 | Tsukuda et al. | |
| 2010/0252510 A1 | 10/2010 | Godsay et al. | |
| 2010/0314333 A1 | 12/2010 | Witsch et al. | |
| 2010/0319543 A1 * | 12/2010 | Witsch | B01D 39/163 95/273 |
| 2010/0326902 A1 | 12/2010 | Midkiff et al. | |
| 2011/0049041 A1 | 3/2011 | Yonemoto | |
| 2011/0114276 A1 | 5/2011 | Cordova et al. | |
| 2011/0168622 A1 * | 7/2011 | Lucas | B01D 39/163 210/490 |
| 2011/0259813 A1 | 10/2011 | Wertz et al. | |
| 2012/0085567 A1 | 4/2012 | Lintz et al. | |
| 2012/0097032 A1 | 4/2012 | Witsch et al. | |
| 2012/0132381 A1 | 5/2012 | Hentze et al. | |
| 2012/0152859 A1 | 6/2012 | Battenfeld et al. | |
| 2013/0233789 A1 | 9/2013 | Parker | |
| 2013/0340398 A1 | 12/2013 | Battenfeld et al. | |
| 2013/0340613 A1 | 12/2013 | Krupnikov et al. | |
| 2013/0341290 A1 | 12/2013 | Yu et al. | |
| 2014/0123613 A1 | 5/2014 | Le Port et al. | |
| 2014/0166572 A1 | 6/2014 | Snyder | |
| 2014/0331626 A1 * | 11/2014 | Nagy | B01D 39/1607 55/487 |
| 2015/0107208 A1 | 4/2015 | Battenfeld et al. | |
| 2015/0321124 A1 | 11/2015 | Battenfeld et al. | |

FOREIGN PATENT DOCUMENTS

| | | |
|---|---|---|
| DE | 10 2009 006 583 A1 | 6/2010 |
| EP | 0 572 569 B1 | 12/1994 |
| EP | 0 898 316 A1 | 2/1999 |
| EP | 1 493 753 A1 | 1/2005 |
| EP | 0 815 209 B1 | 1/2006 |
| EP | 1 849 896 | 10/2007 |
| WO | WO 96/29397 A1 | 9/1996 |
| WO | WO 97/23669 A1 | 7/1997 |
| WO | WO 98/07911 A1 | 2/1998 |
| WO | WO 99/45875 A1 | 9/1999 |
| WO | WO 00/66820 A1 | 11/2000 |
| WO | WO 01/86043 A1 | 11/2001 |
| WO | WO 03/033806 A2 | 4/2003 |
| WO | WO 03/063996 A2 | 8/2003 |
| WO | WO 03/064006 A1 | 8/2003 |

(56) References Cited

FOREIGN PATENT DOCUMENTS

| | | |
|---|---|---|
| WO | WO 2004/026958 A1 | 4/2004 |
| WO | WO 2005/001174 A1 | 1/2005 |
| WO | WO 2005/009589 A1 | 2/2005 |
| WO | WO 2005/016208 A1 | 2/2005 |
| WO | WO 2005/017247 A2 | 2/2005 |
| WO | WO 2005/040495 A1 | 5/2005 |
| WO | WO 2005/072950 A1 | 8/2005 |
| WO | WO 2006/007020 A1 | 1/2006 |
| WO | WO 2006/083668 A3 | 8/2006 |
| WO | WO 2006/083796 A2 | 8/2006 |
| WO | WO 2007/089230 A2 | 8/2007 |
| WO | WO 2007/112916 A1 | 10/2007 |
| WO | WO 2007/113772 A1 | 10/2007 |
| WO | WO 2007/120342 A2 | 10/2007 |
| WO | WO 2009/006206 A1 | 1/2009 |
| WO | WO 2009/006207 A1 | 1/2009 |
| WO | WO 2009/059342 A1 | 5/2009 |
| WO | WO 2009/061575 A1 | 5/2009 |
| WO | WO 2009/088635 A2 | 7/2009 |
| WO | WO 2009/107024 A1 | 9/2009 |
| WO | WO 2009/117356 A1 | 9/2009 |
| WO | WO 2009/117361 A1 | 9/2009 |
| WO | WO 2009/117363 A1 | 9/2009 |
| WO | WO 2009/123899 A2 | 10/2009 |
| WO | WO 2010/008621 A1 | 1/2010 |
| WO | WO 2011/134939 A1 | 11/2011 |
| WO | WO 2012/124652 A1 | 9/2012 |
| WO | WO 2013/132161 A2 | 9/2013 |

OTHER PUBLICATIONS

International Preliminary Report on Patentability for PCT/US2011/065484 mailed Jun. 27, 2013.
International Search Report and Written Opinion for PCT/US2013/046736 mailed Nov. 12, 2013.
International Search Report and Written Opinion for PCT/US2013/046752 mailed Nov. 5, 2013.
International Search Report and Written Opinion for PCT/US2013/074261 mailed Apr. 14, 2014.
Boldizar et al., Prehydrolyzed cellulose as reinforcing filler for thermoplastics. Int J Polymeric Mat. 1987;4:229-62.
Burger et al., Nanofibrous materials and their applications. Annu. Rev. Mater. Res. 2006;36:333-68.
Chinga-Carrasco et al., Cellulose fibres, nanofibrils and microfibrils: the morphological sequence of MFC components from a plant physiology and fibre technology point of view. Nanoscale Res Lett. 2011;6:417-423.
Garcia De Rodriguez et al., Sisal cellulose whiskers reinforced polyvinyl acetate nanocomposites. Cellulose. 2006;13:261-70.
Henriksson et al., Cellulose nanopaper structures of high toughness. Biomacromolecules. 2008;9:1579-85.
Henriksson et al., Structure and properties of cellulose nanocomposite films containing melamine formaldehyde. J. Appl. Sci. 2007;106:2817-24.
Nakagaito et al., Novel high-strength bicomposites based on microfibrillated cellulose having nano-order unit web-like network structure. Appl. Phys. A. 2005;80:155-9.
Nakagaito et al., The effect of morphological changes from pulp fiber towards nano-scale fibrillated cellulose on the mechanical properties of high-strength plnt fiber based composites. Appl. Phys A. 2004;78:547-52.
Nordqvist et al., Ehancement of the wet properties of transparent chitosan-acetic-acid-salt films using microfibrillated cellulose. Biomacromolec. 2007;8:2398-403.
Ragauskas et al., A nano perspective of cellulose. School of Chemistry and Biochemistry Institute of Paper Science and Technology Georgia Institute of Technology. Feb. 2007. PowerPoint. 24 pages.
Siro et al., Microfibrillated cellulose and new nanocomposite materials: a review. Cellulose. 2010;17:459-94.
Svagan et al., Biomimetic foams of high mechanical performance based on nanostructured cell walls reinforced by native cellulose nanofibrils. Adv. Mater. 2008;20:1263-9.
Svagan et al., Biomimetic polysaccharide nanocomposites of high cellulose content and high toughness. Biomacromolecules. 2007;8:2556-63.
Teague et al., Cellulose nanomaterials—come and get it! Ahead of the Curve. Dec. 12, 2012. http://www.tappi.org/content/enewsletters/ahead/2012/issues/2012-12-12.html?utm_source=Informz&utm_medium=email&utm_campaign=Email.
Zimmermann et al., Cellulose fibrils for polymer reinforcement. Adv. Eng. Mater. 2004;6(9):754-61.
Extended European Search Report for EP11849727.0 mailed Feb. 10, 2016.
Partial Supplementary European Search Report for EP13807320.0 mailed Feb. 3, 2016.
International Preliminary Report on Patentability for PCT/US2013/046736 mailed Dec. 31, 2014.
Partial Supplementary European Search Report for EP13807376.2 mailed Feb. 3, 2016.
International Preliminary Report on Patentability for PCT/US2013/046752 mailed Dec. 31, 2014.
International Preliminary Report on Patentability for PCT/US2013/074261 Jun. 25, 2015.
Invitation to Pay Additional Fees for PCT/US2014/071547 maild Mar. 12, 2015.
International Search Report and Written Opinion for PCT/US2014/071547 mailed May 29, 2015.
U.S. Appl. No. 14/684,726, filed Apr. 13, 2015, Battenfeld et al.
U.S. Appl. No. 14/498,662, filed Sep. 26, 2014, Battenfeld et al.

* cited by examiner

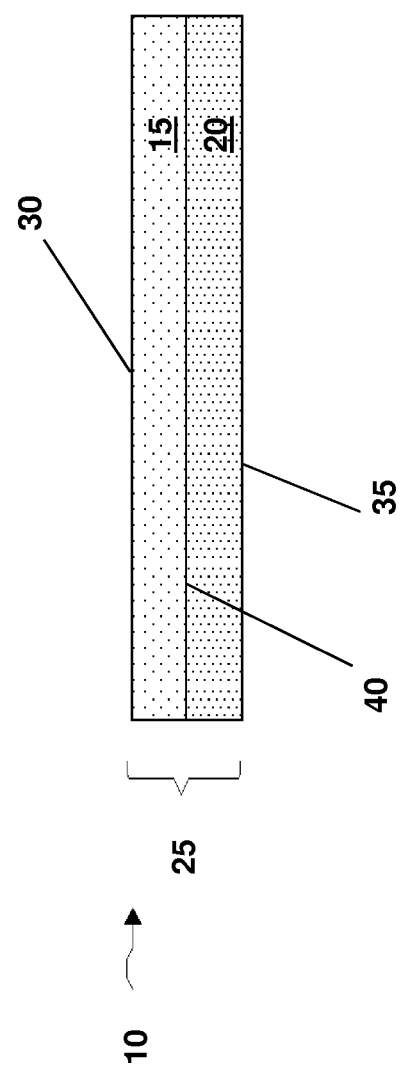

FIBRILLATED FIBERS FOR LIQUID FILTRATION MEDIA

RELATED APPLICATION

The present application is a continuation-in-part of U.S. patent application Ser. No. 13/528,774, filed on Jun. 20, 2012 and entitled "Fibrillated Fibers for Liquid Filtration Media", which is hereby incorporated by reference in its entirety.

FIELD OF INVENTION

Aspects described herein relate generally to fiber webs that include fibrillated fibers that can be used in filter media.

BACKGROUND

Filter media can be used to remove contamination in a variety of applications. In general, filter media include one or more fiber webs. The fiber web provides a porous structure that permits fluid (e.g., fuel, lube, hydraulic fluid, air) to flow through the web. Contaminant particles contained within the fluid may be trapped on the fiber web. Fiber web characteristics (e.g., fiber dimensions, fiber composition, basis weight, amongst others) affect mechanical properties (e.g., elongation, strength, amongst others) and filtration performance (e.g., dust holding capacity, liquid filtration efficiency, amongst others).

Certain filter media include webs that comprise glass fibers. While often having desirable filtration performance, glass fiber webs may exhibit limited strength and brittle characteristics which can lead to fiber shedding during handling, further processing (e.g., pleating, slitting), installation, and use. The presence of glass fibers in filter media may also give rise to environmental concerns.

In some applications, it would be desirable to limit the amount of glass fiber in a fiber web, while still achieving a desirable balance of properties including high filtration efficiency at a given pressure drop and/or high dust holding capacity, amongst others.

SUMMARY

Fibers webs that include fibrillated fibers and can be used in filter media are described herein.

In some embodiments, a series of filter media are provided. In one set of embodiments, a filter media comprises a wet laid fiber web comprising a plurality of 3372953) synthetic fibers. The wet laid fiber web has a [mean flow pore $(\mu m)$/(permeability $(cfm/sf))^{0.5}$] value of less than or equal to about 3.0. Moreover, the wet laid fiber web comprises between about 0 wt % to about 10 wt % of glass fibers. The filter media has an basis weight of greater than about 10 g/m² and less than or equal to about 1000 g/m², and a thickness of between about 0.1 mm and about 10.0 mm.

In another set of embodiments, a filter media comprises a fiber web comprising a plurality of synthetic fibers. The fiber web has a [mean flow pore $(\mu m)$/(permeability $(cfm/sf))^{0.5}$] value of less than about 3.0. Moreover, the fiber web has a dust holding capacity of greater than or equal to about 80 g/m², wherein the dust holding capacity is measured using a Multipass Filter Tests at a 25 mg/L base upstream gravimetric level (BUGL), a face velocity of 0.06 cm/s, and a 100 kPa terminal pressure following the ISO 16889/19438 procedure. The wet laid fiber web comprises between about 0 wt % to about 10 wt % of glass fibers. Additionally, the filter media has an basis weight of greater than about 10 g/m² and less than or equal to about 1000 g/m² and a thickness of between about 0.1 mm and about 10 mm.

In another set of embodiments, a filter media comprises a fiber web comprising a plurality of fibrillated fibers. The fiber web comprises about 0 wt % to about 10 wt % of glass fibers. The filter media has a liquid filtration efficiency of at least 98% for 4 microns or greater particles, wherein the efficiency is measured using a Multipass Filter Tests at a 25 mg/L base upstream gravimetric level (BUGL), a face velocity of 0.06 cm/s, and a 100 kPa terminal pressure following the ISO 16889/19438 procedure. Additionally, the filter media has a basis weight of greater than about 10 g/m² and less than or equal to about 1000 g/m², and a thickness of between about 0.1 mm and about 10 mm.

In another set of embodiments, a filter media comprises a first layer comprising a plurality of organic polymer fibers, and a second layer comprising greater than or equal to about 60 wt % fibrillated fibers. The first layer has a first basis weight of greater than or equal to about 10 g/m² and less than about 300 g/m². The second layer has a second basis weight of greater than or equal to about 3 g/m² and less than about 200 g/m². The ratio of the first basis weight to the second basis weight is at least 3:1 and less than 14:1. The filter media has a thickness of between about 0.3 mm and about 10 mm.

In another set of embodiments, a filter media comprises a first layer and a second layer in combination with an additional layer (e.g., a third layer). The first layer and/or second layer is a wet laid layer (e.g., a layer formed by a wet laid process). The additional layer is a non-wet laid layer (e.g., a layer formed by a non-wet laid process) and may include meltblown fibers, meltspun fibers, centrifugal spun fibers, or fibers formed by other non-wet laid processes. The first layer comprises a plurality of organic polymer fibers, and the second layer comprises a plurality of synthetic fibers. At least one of the first and second layers includes fibrillated fibers (e.g., between about 1 wt % and about 100 wt % of the first and/or second layers). The first and/or second layers comprises between about 0 wt % to about 10 wt % of glass fibers. The additional layer includes synthetic polymer fibers. The filter media can achieve a fuel-water separation efficiency of at least about 30% (e.g., between about 60% to about 99.9%).

In certain embodiments described above and herein, the first and/or second layer may be a non-wet laid layer (e.g., formed of meltblown fibers, meltspun fibers, dry laid (carded) fibers, centrifugal spun fibers, spunbond fibers, and/or air laid fibers) as described herein.

In certain embodiments described above and herein, the additional layer may have a basis weight of between about 5 g/m² and about 800 g/m², an air permeability of less than about 1300 cfm/sf, and an average fiber diameter of less than 100 microns.

In certain embodiments described above and herein, the overall filter media may have a basis weight of greater than about 10 g/m² and less than or equal to about 1000 g/m², a thickness of between about 0.1 mm and about 10.0 mm.

In certain embodiments described above and herein, the filter media can achieve an efficiency at 4 microns of at least 99%, an initial efficiency of at least 99%, and a dust holding capacity of at least 150 gsm.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figure, which is schematic and is not intended to be drawn to scale. In the figure, each identical or nearly identical component illustrated is typically represented by a single numeral. For purposes of clarity, not every component is labeled, nor is every component of each embodiment of the invention shown where illustration is not necessary to allow those of ordinary skill in the art to understand the invention. In the figures:

FIG. 1 is a schematic diagram showing a fiber web according to one set of embodiments.

DETAILED DESCRIPTION

Fiber webs which are used in filter media are described herein. In some embodiments, the fiber webs include fibrillated fibers and optionally non-fibrillated fibers, amongst other optional components (e.g., binder resin). In some embodiments, the fiber webs include limited amounts of, or no, glass fiber. The respective characteristics and amounts of the fibrillated fibers are selected to impart desirable properties including mechanical properties and filtration properties (e.g., dust holding capacity and efficiency), amongst other benefits. Filter media formed of the webs may be particularly well-suited for applications that involve filtering fuel, though the media may also be used in other applications (e.g., for filtering lube, hydraulic fluids, air). In some embodiments, the fiber webs described herein may include multiple layers, though other arrangements are possible.

Advantageously, in some embodiments the use of fibrillated fibers can increase the surface area of the fiber web, leading to an improvement in one or more properties of the media such as increased particle capture efficiency and/or dust holding capacity. The use of fibrillated fibers may also lead to a decrease in the mean pore size of the fiber web compared to a fiber web having similar properties (e.g., basis weight, fiber type, etc.) but absent fibrillated fibers. Accordingly, a fiber web including such fibrillated fibers may have a relatively low pressure drop while achieving an increased efficiency per unit thickness. In some embodiments, the fiber webs described herein can achieve such improved properties with limited amounts of, or no, glass fibers.

The fiber webs described herein may have a single layer, or multiple layers. In some embodiments involving multiple layers, a clear demarcation of layers may not always be apparent, as described in more detail below. An example of a fiber web is shown in FIG. 1. As shown illustratively in FIG. 1, a fiber web 10 includes a first layer 15 and a second layer 20 having a combined thickness 25. Optionally, the fiber web may include additional layers (not shown). The first layer may be positioned upstream or downstream of the second layer in a filter element. In some embodiments, the first layer is a relatively open layer (e.g., having a relatively higher air permeability) compared to the second layer, and the second layer is a relatively tight layer (e.g., having a relatively lower air permeability) compared to the first layer. In other embodiments, the first layer is a relatively tight layer compared to the first layer, and the second layer is a relatively open layer compared to the second layer.

As described in more detail below, one or more fibrillated fibers may be present in at least one layer of the fiber web, such as in the first layer, in the second layer, in both layers, or in all layers. In some embodiments, the first layer may be constructed to have a relatively high dust holding capacity. The first layer may also be constructed to have a relatively high filtration efficiency in some cases. The first layer may include fibrillated fibers in some embodiments, but does not include fibrillated fibers in other embodiments. In some instances, the first layer may be positioned upstream of the second layer in a filter element. In some embodiments, the second layer includes one or more fibrillated fibers and is constructed to achieve a relatively high filtration efficiency. The second layer may also have good dust holding properties in some embodiments. The second layer may be positioned downstream of the first layer in a filter element. As described in more detail below, the properties of the fiber web may be tailored by varying the amount of fibrillated fibers, the type of fibrillated fibers, and/or the level of fibrillation of the fibers present in one or more layers of the fiber web. Examples of suitable types, amounts, and levels of fibrillation for fibrillated fibers in each of the layers are provided below.

It should be appreciated that while FIG. 1 shows only first and second layers, other layers may be present in other embodiments. For example, a fiber web may include a third layer positioned directly adjacent the first layer (e.g., on the side opposite the second layer), directly adjacent the second layer (e.g., on the side opposite the first layer), or between the first and second layers. Additional layers are also possible. In certain embodiments, an additional layer (e.g., a third layer, a fourth layer, etc.) may be used to enhance one or more of dust holding capacity, lifetime, liquid filtration efficiency, water separation efficiency, and/or strength (e.g., Mullen burst strength, tensile strength, elongation) in the fiber web, as described in more detail below. Moreover, it should be appreciated that any additional layers (e.g., a third layer, a fourth layer, etc.) may have any of the features or properties described herein for the first or second layers.

In some embodiments, fiber web 10 includes a clear demarcation between the first and second layers. For example, the fiber web may include an interface 40 between the two layers that is distinct. In some such embodiments, the first and second layers may be formed separately, and combined by any suitable method such as lamination, collation, or by use of adhesives. The first and second layers (and any additional layer(s)) may be formed using different processes, or the same process. For example, each of the first and second layers (and any additional layer(s)) may be independently formed by a wet laid process, a non-wet laid process (e.g., a dry laid process, a spinning process, a meltblown process), or any other suitable process.

In other embodiments, fiber web 10 does not include a clear demarcation between the first and second layers. For example, a distinct interface between the two layers may not be apparent. In some cases, the layers forming a fiber web may be indistinguishable from one another across the thickness of the fiber web. The first and second layers may be formed by the same process (e.g., a wet laid process, a non-wet laid process (e.g., a dry laid process, a spinning process, a meltblown process), or any other suitable process) or by different processes in such embodiments. In some instances, the first and second layers may be formed simultaneously.

Regardless of whether a clear demarcation between first and second layers is present, in some embodiments, fiber web 10 includes a gradient (i.e., a change) in one or more properties such as amount of fibrillated fiber, level of fibrillation of fibers, fiber diameter, fiber type, fiber composition, fiber length, fiber surface chemistry, pore size, material density, basis weight, solidity, a proportion of a component (e.g., a binder, resin, crosslinker), stiffness, tensile strength, wicking ability, hydrophilicity/hydrophobicity, and conductivity across a portion, or all of, the thickness of the fiber web. Fiber webs suitable for use as filter media may optionally include a gradient in one or more performance characteristics such as efficiency, dust holding capacity, pressure drop, permeability, and porosity across the thickness of the fiber web. A gradient in one or more such properties may be present in the fiber web between a top surface 30 and a bottom surface 35 of the fiber web.

Different types and configurations of gradients are possible within a fiber web. In some embodiments, a gradient in one or more properties is gradual (e.g., linear, curvilinear) between a top surface and a bottom surface of the fiber web. For example, the fiber web may have an increasing amount of fibrillated fiber from the top surface to the bottom surface of the fiber web. In another embodiment, a fiber web may include a step gradient in one more properties across the thickness of the fiber web. In one such embodiment, the transition in the property may occur primarily at interface 40 between the two layers. For example, a fiber web, e.g., having a first layer including a first fiber type and a second layer including a second fiber type, may have an abrupt transition between fiber types across the interface. In other words, each of the layers of the fiber web may be relatively distinct. Other types of gradients are also possible.

In certain embodiments, a fiber web may include a gradient in one or more properties through portions of the thickness of the fiber web. In the portions of the fiber web where the gradient in the property is not present, the property may be substantially constant through that portion of the web. As described herein, in some instances a gradient in a property involves different proportions of a component (e.g., a type of fiber such as a fibrillated fiber, hardwood fibers, softwood fibers, an additive, a binder) across the thickness of a fiber web. In some embodiments, a component may be present at an amount or a concentration that is different than another portion of the fiber web. In other embodiments, a component is present in one portion of the fiber web, but is absent in another portion of the fiber web. Other configurations are also possible.

In some embodiments, a fiber web has a gradient in one or more properties in two or more regions of the fiber web. For example, a fiber web including three layers may have a first gradient in one property across the first and second layer, and a second gradient in another property across the second and third layers. The first and second gradients may be the same in some embodiments, or different in other embodiments (e.g., characterized by a gradual vs. an abrupt change in a property across the thickness of the fiber web). Other configurations are also possible.

A fiber web may include any suitable number of layers, e.g., at least 2, 3, 4, 5, 6, 7, 8, or 9 layers depending on the particular application and performance characteristics desired. It should be appreciated that in some embodiments, the layers forming a fiber web may be indistinguishable from one another across the thickness of the fiber web. As such, a fiber web formed from, for example, two "layers" or two "fiber mixtures" can also be characterized as having a single "layer" (or a "composite" layer) having a gradient in a property across the fiber web in some instances. Such composite layers may optionally be combined with additional layers in the fiber web to form, for example, fiber webs having a gradient in one or more properties in certain portions of the fiber web, but not in other portions of the fiber web.

For example, in one set of embodiments, the first layer of fiber web 10 of FIG. 1 does not include a gradient of a property across the thickness of the first layer, but the second layer does include a gradient of a property across the thickness of the second layer. In another example, the first layer of fiber web 10 of FIG. 1 includes a gradient of a property across the thickness of the first layer, but the second layer does not include a gradient of a property across the thickness of the second layer. In other embodiments, both the first layer and the second layer includes a gradient of one or more properties across the thicknesses of the layers. Other configurations are also possible. As described herein, the one or more properties varying across the thickness of a layer may include, for example, a concentration of a fibrillated fiber, level of fibrillation of fibers, fiber type (e.g., type of fibrillated fiber), fiber diameter, fiber composition, fiber length, fiber surface chemistry, pore size, material density, basis weight, solidity, a proportion of a component (e.g., a binder, resin, crosslinker), stiffness, tensile strength, wicking ability, hydrophilicity/hydrophobicity, and/or conductivity.

As noted above, the fiber webs described herein include one or more fibrillated fibers. As known to those of ordinary skill in the art, a fibrillated fiber includes a parent fiber that branches into smaller diameter fibrils which can, in some instances, branch further out into even smaller diameter fibrils with further branching also being possible. The branched nature of the fibrils leads to a fiber web having a high surface area and can increase the number of contact points between the fibrillated fibers and other fibers in the web. Such an increase in points of contact between the fibrillated fibers and other fibers and/or components of the web may contribute to enhancing mechanical properties (e.g., flexibility, strength) and/or filtration performance properties of the fiber web.

In general, the fibrillated fibers included in a fiber web may have any suitable level of fibrillation. The level of fibrillation relates to the extent of branching in the fiber. In some embodiments, the average level of fibrillation of fibers may vary between different layers in a multi-layered fiber web. For example, a first layer may include fibers having a relatively low level of fibrillation compared to the fibers of a second layer. In other embodiments, a first layer may include fibers having a relatively high level of fibrillation compared to the fibers of a second layer.

The average level of fibrillation may vary in a layer (or vary in the entire web) depending on whether the layer (or web) includes a single type of fibrillated fiber or more than one type of fibrillated fiber. The same fiber type, but fibers fibrillated to different extents, may also be used in one or more layers of the fiber web.

The level of fibrillation may be measured according to any number of suitable methods. For example, the level of fibrillation of the fibrillated fibers can be measured according to a Canadian Standard Freeness (CSF) test, specified by TAPPI test method T 227 om 09 Freeness of pulp. The test can provide an average CSF value. In some embodiments, the average CSF value of the fibrillated fibers used in a fiber web may vary between about 10 mL and about 750 mL. In certain embodiments, the average CSF value of the fibrillated fibers used in a fiber web may be greater than or equal to 1 mL, greater than or equal to about 10 mL, greater than or equal to about 20 mL, greater than or equal to about 35 mL, greater than or equal to about 45 mL, greater than or equal to about 50 mL, greater than or equal to about 65 mL, greater than or equal to about 70 mL, greater than or equal to about 75 mL, greater than or equal to about 80 mL, greater than or equal to about 100 mL, greater than or equal to about 150 mL, greater than or equal to about 175 mL, greater than or equal to about 200 mL, greater than or equal to about 250 mL, greater than or equal to about 300 mL, greater than or equal to about 350 mL, greater than or equal to about 500 mL, greater than or equal to about 600 mL, greater than or equal to about 650 mL, greater than or equal to about 700 mL, or greater than or equal to about 750 mL.

In some embodiments, the average CSF value of the fibrillated fibers used in a fiber web may be less than or equal to about 800 mL, less than or equal to about 750 mL, less than or equal to about 700 mL, less than or equal to about 650 mL, less than or equal to about 600 mL, less than or equal to about 550 mL, less than or equal to about 500 mL, less than or equal to about 450 mL, less than or equal to about 400 mL, less than or equal to about 350 mL, less than or equal to about 300 mL, less than or equal to about 250 mL, less than or equal to about 225 mL, less than or equal to about 200 mL, less than or equal to about 150 mL, less than or equal to about 100 mL, less than or equal to about 90 mL, less than or equal to about 85 mL, less than or equal to about 70 mL, less than or equal to about 50 mL, less than or equal to about 40 mL, or less than or equal to about 25 mL. Combinations of the above-referenced ranges are also possible (e.g., an average CSF value of fibrillated fibers of greater than or equal to about 10 mL and less than or equal to about 300 mL). Other ranges are also possible. The average CSF value of the fibrillated fibers used in a fiber web may be based on one type of fibrillated fiber or more than one type of fibrillated fiber.

In some embodiments, the level of fibrillation of the fibrillated fibers can be measured according to a Schopper Riegler (SR) test. In some embodiments, the average SR value of the fibrillated fibers may be greater than about 20° SR, greater than about 30° SR, greater than about 40° SR, greater than about 50° SR, or greater than about 60° SR. In some embodiments, the average SR value of the fibrillated fibers may be less than about 80° SR, less than about 70° SR, less than about 60° SR, less than about 50° SR, or less than about 40° SR. It can be appreciated that the average SR values may be between any of the above-noted lower limits and upper limits. For example, the average SR value of the fibrillated fibers may be between about 20° SR and about 70° SR, between about 20° SR and about 60° SR, or between about 30° SR and about 50° SR, between about 32° SR and about 52° SR, or between about 40° SR and about 50° SR.

It should be understood that, in certain embodiments, the fibers may have fibrillation levels outside the above-noted ranges.

In embodiments in which the fiber web includes at least first and second layers, such as in the embodiment shown illustratively in FIG. 1, the average CSF value of fibrillated fibers (if present) in each of the layers may vary. For example, if fibrillated fibers are included in the first layer, the average CSF value of the fibrillated fibers in the first layer may vary between about 10 mL and about 750 mL. In certain embodiments, the average CSF value of the fibrillated fibers used in a first layer may be greater than or equal to 1 mL, greater than or equal to about 10 mL, greater than or equal to about 20 mL, greater than or equal to about 35 mL, greater than or equal to about 45 mL, greater than or equal to about 50 mL, greater than or equal to about 65 mL, greater than or equal to about 70 mL, greater than or equal to about 75 mL, greater than or equal to about 80 mL, greater than or equal to about 100 mL, greater than or equal to about 150 mL, greater than or equal to about 175 mL, greater than or equal to about 200 mL, greater than or equal to about 250 mL, greater than or equal to about 300 mL, greater than or equal to about 350 mL, greater than or equal to about 500 mL, greater than or equal to about 600 mL, greater than or equal to about 650 mL, greater than or equal to about 700 mL, or greater than or equal to about 750 mL.

In some embodiments, the average CSF value of the fibrillated fibers used in a first layer may be less than or equal to about 750 mL, less than or equal to about 700 mL, less than or equal to about 650 mL, less than or equal to about 600 mL, less than or equal to about 550 mL, less than or equal to about 500 mL, less than or equal to about 450 mL, less than or equal to about 400 mL, less than or equal to about 350 mL, less than or equal to about 300 mL, less than or equal to about 250 mL, less than or equal to about 225 mL, less than or equal to about 200 mL, less than or equal to about 150 mL, less than or equal to about 100 mL, less than or equal to about 90 mL, less than or equal to about 85 mL, less than or equal to about 70 mL, less than or equal to about 50 mL, less than or equal to about 40 mL, or less than or equal to about 25 mL. Combinations of the above-referenced ranges are also possible (e.g., an average CSF value of fibrillated fibers of greater than or equal to about 10 mL and less than or equal to about 300 mL). Other ranges are also possible. The average CSF value of the fibrillated fibers used in a first layer may be based on one type of fibrillated fiber or more than one type fibrillated fiber.

If fibrillated fibers are included in the second layer, the average CSF value of the fibrillated fibers in the second layer may vary between about 10 mL and about 750 mL. In certain embodiments, the average CSF value of the fibrillated fibers used in a second layer may be greater than or equal to 1 mL, greater than or equal to about 10 mL, greater than or equal to about 20 mL, greater than or equal to about 35 mL, greater than or equal to about 45 mL, greater than or equal to about 50 mL, greater than or equal to about 65 mL, greater than or equal to about 70 mL, greater than or equal to about 75 mL, greater than or equal to about 80 mL, greater than or equal to about 100 mL, greater than or equal to about 150 mL, greater than or equal to about 175 mL, greater than or equal to about 200 mL, greater than or equal to about 250 mL, greater than or equal to about 300 mL, greater than or equal to about 350 mL, greater than or equal to about 500 mL, greater than or equal to about 600 mL, greater than or equal to about 650 mL, greater than or equal to about 700 mL, or greater than or equal to about 750 mL.

In some embodiments, the average CSF value of the fibrillated fibers used in a second layer may be less than or equal to about 750 mL, less than or equal to about 700 mL, less than or equal to about 650 mL, less than or equal to about 600 mL, less than or equal to about 550 mL, less than or equal to about 500 mL, less than or equal to about 450 mL, less than or equal to about 400 mL, less than or equal to about 350 mL, less than or equal to about 300 mL, less than or equal to about 250 mL, less than or equal to about 225 mL, less than or equal to about 200 mL, less than or equal to about 150 mL, less than or equal to about 100 mL, less than or equal to about 90 mL, less than or equal to about 85 mL, less than or equal to about 70 mL, less than or equal to about 50 mL, less than or equal to about 40 mL, or less than or equal to about 25 mL. Combinations of the above-referenced ranges are also possible (e.g., an average CSF value of fibrillated fibers of greater than or equal to about 10 mL and less than or equal to about 300 mL). Other ranges are also possible. The average CSF value of the fibrillated fibers used in a second layer may be based on one type of fibrillated fiber or more than one type fibrillated fiber.

A fibrillated fiber may be formed of any suitable materials such as synthetic materials (e.g., synthetic polymers such as polyester, polyamide, polyaramid, para-aramid, meta-aramid, polyimide, polyethylene, polypropylene, polyether ether ketone, polyethylene terephthalate, polyolefin, nylon, acrylics, regenerated cellulose (e.g., lyocell, rayon), liquid crystal polymers (e.g., poly p-phenylene-2,6-bezobisoxazole (PBO), polyester-based liquid crystal polymers such as polyesters produced by the polycondensation of 4-hydroxybenzoic acid and 6-hydroxynaphthalene-2-carboxylic acid), and natural materials (e.g., natural polymers such as cellulose (e.g., non-regenerated cellulose), organic fibers such as wool). In some embodiments, organic polymer fibers are used. In certain embodiments, carbon fibers are used.

In some embodiments, fibrillated fibers may be synthetic fibers. Synthetic fibers as used herein, are non-naturally occurring fibers formed of polymeric material. Fibrillated fibers may also be non-synthetic fibers, for example, cellulose fibers that are naturally occurring. Cellulose fibers may include, for example, wood cellulose fibers and non-wood cellulose fibers. It can be appreciated that fibrillated fibers may include any suitable combination of synthetic and/or non-synthetic fibers.

In certain embodiments, the fibrillated fibers are formed of lyocell. Lyocell fibers are known to those of skill in the art as a type of synthetic fiber and may be produced from regenerated cellulose by solvent spinning.

In certain embodiments, the fibrillated fibers are formed of rayon. Rayon fibers are known to those of ordinary skill in the art. They are also produced from regenerated cellulose and may be produced using an acetate method, a cuprammonium method, or a viscose process. In these methods, the cellulose or cellulose solution may be spun to form fibers.

Fibers may be fibrillated through any appropriate fibrillation refinement process. In some embodiments, fibers are fibrillated using a disc refiner, a stock beater or any other suitable fibrillating equipment.

It should be understood that, in certain embodiments, the fibrillated fibers may have compositions other than those described above. For example, suitable compositions may include acrylic, liquid crystalline polymers, polyoxazole (e.g., poly(p-phenylene-2,6-benzobisoxazole), aramid, paramid, cellulose wood, cellulose non-wood, cotton, polyethylene, polyolefin and olefin, amongst others.

In general, the fibrillated fibers may have any suitable dimensions (e.g., dimensions measured via a microscope).

As noted above, fibrillated fibers include parent fibers and fibrils. The parent fibers may have an average diameter of, for example, between about 1 micron about 75 microns. In some embodiments, the parent fibers may have an average diameter of less than or equal to about 75 microns, less than or equal to about 60 microns, less than or equal to about 50 microns, less than or equal to about 40 microns, less than or equal to about 30 microns, less than or equal to about 20 microns, or less than or equal to about 15 microns. In some embodiments the parent fibers may have an average diameter of greater than or equal to about 10 microns, greater than or equal to about 15 microns, greater than or equal to about 20 microns, greater than or equal to about 30 microns, greater than or equal to about 40 microns, greater than or equal to about 50 microns, greater than or equal to about 60 microns, or greater than or equal to about 75 microns. Combinations of the above referenced ranges are also possible (e.g., parent fibers having an average diameter of greater than or equal to about 15 microns and less than about 75 microns). Other ranges are also possible.

The fibrils may have an average diameter of, for example, between about 0.2 micron about 15 microns. In some embodiments, the fibrils may have an average diameter of less than or equal to about 15 microns, less than or equal to about 10 microns, less than or equal to about 8 microns, less than or equal to about 6 microns, less than or equal to about 4 microns, less than or equal to about 3 microns, less than or equal to about 2 microns, or less than or equal to about 1 micron. In some embodiments the fibrils may have an average diameter of greater than or equal to about 0.2 microns, greater than or equal to about 1 micron, greater than or equal to about 2 microns, greater than or equal to about 3 microns, greater than or equal to about 4 microns, greater than or equal to about 6 microns, greater than or equal to about 8 microns, or greater than or equal to about 10 microns. Combinations of the above referenced ranges are also possible (e.g., fibrils having an average diameter of greater than or equal to about 3 microns and less than about 6 microns). Other ranges are also possible.

The fibrillated fibers described may have an average length of, for example, between about 1 mm and about 15 mm (e.g., between about 0.2 and about 12 mm, or between about 2 mm and about 4 mm). In some embodiments, the average length of a fibrillated fiber may be less than or equal to about 15 mm, less than or equal to about 12 mm, less than or equal to about 10 mm, less than or equal to about 8 mm, less than or equal to about 6 mm, less than or equal to about 4 mm, or less than or equal to about 2 mm. In certain embodiments, the average length of a fibrillated fiber may be greater than or equal to about 2 mm, greater than or equal to about 4 mm, greater than or equal to about 6 mm, greater than or equal to about 8 mm, greater than equal to about 10 mm, or greater than or equal to about 12 mm. Combinations of the above referenced ranges are also possible (e.g., fibrillated fibers having an average length of greater than or equal to about 2 mm and less than about 12 mm). Other ranges are also possible. The average length of the fibrillated fibers refers to the average length of parent fibers from one end to an opposite end of the parent fibers. In some embodiments, the maximum average length of the fibrillated fibers fall within the above-noted ranges. The maximum average length refers to the average of the maximum dimension along one axis of the fibrillated fibers (including parent fibers and fibrils).

The above-noted dimensions may be, for example, when the fibrillated fibers are lyocell or when the fibrillated fibers are a material other than lyocell. It should be understood that, in certain embodiments, the fibers and fibrils may have dimensions outside the above-noted ranges.

In general, the fiber web may include any suitable weight percentage of fibrillated fibers to achieve the desired balance of properties. In some embodiments, the weight percentage of the fibrillated fibers in the fiber web is between about 1 wt % and about 100 wt % (e.g., between about 2 wt % and about 60 wt %). For instance, the weight percentage of fibrillated fibers in the fiber web may be greater than or equal to about 2 wt %, greater than or equal to about 5 wt %, greater than or equal to about 10 wt %, greater than or equal to about 15 wt %, greater than or equal to about 20 wt %, greater than or equal to about 25 wt %, greater than or equal to about 30 wt %, greater than or equal to about 35 wt %, greater than or equal to about 40 wt %, greater than or equal to about 45 wt %, greater than or equal to about 50 wt %, or greater than or equal to about 60 wt %. In some embodiments, the weight percentage of the fibrillated fibers in the web is less than or equal to about 100 wt %, less than or equal to about 90 wt %, less than or equal to about 80 wt %, less than or equal to about 70 wt %, less than or equal to about 60 wt %, less than or equal to about 55 wt %, less than or equal to about 50 wt %, less than or equal to about 45 wt %, less than or equal to about 40 wt %, less than or equal to about 35 wt %, less than or equal to about 30 wt %, less than or equal to about 25 wt %, less than or equal to about 20 wt %, less than or equal to about 15 wt %, less than or equal to about 10 wt %, or less than or equal to about 5 wt %. Combinations of the above-referenced ranges are also possible (e.g., a weight percentage of greater than about 2 wt % and less than or equal to about 25 wt %). Other ranges are also possible.

In some embodiments, fiber webs having an amount of fibrillated fibers that is greater than that of other fiber webs may exhibit a comparatively greater degree of flexibility and strength, for example, an increased elongation, tensile strength and/or burst strength than the other fiber webs.

In certain embodiments, a fiber web or a layer within a fiber web (e.g., a first layer or a second layer) includes fibrillated fibers having a relatively high degree of fibrillation. In some such embodiments, lower amounts of fibrillated fiber may be needed in order to achieve the same structural and/or performance characteristics as a fiber web including fibrillated fibers having a relatively lower degree of fibrillation but larger amounts of such fibers. In certain embodiments, a fiber web or a layer within a fiber web (e.g., a first layer or a second layer) includes fibrillated fibers having an average CSF value of greater than or equal to about 10 mL and less than or equal to about 300 mL, less than or equal to about 250 mL, less than or equal to about 225 mL, less than or equal to about 200 mL, less than or equal to about 150 mL, less than or equal to about 100 mL, less than or equal to about 90 mL, less than or equal to about 85 mL, less than or equal to about 70 mL, less than or equal to about 50 mL, less than or equal to about 40 mL, or less than or equal to about 25 mL. The weight percentage of fibrillated fibers in such a fiber web or layer within the fiber web may be, for example, greater than or equal to about 2 wt % (e.g., greater than or equal to about 5 wt %, greater than or equal to about 10 wt %, greater than or equal to about 15 wt %, greater than or equal to about 20 wt %, greater than or equal to about 25 wt %, greater than or equal to about 30 wt %, greater than or equal to about 35 wt %, greater than or equal to about 40 wt %, greater than or equal to about 45 wt %, greater than or equal to about 50 wt %, greater than or equal to about 60 wt %. greater than or equal to about 70 wt %, greater than or equal to about 80 wt %) and less than or equal to about 90 wt %, less than or equal to about 80 wt %, less than or equal to about 70 wt %, less than or equal to about 60 wt %, less than or equal to about 55 wt %, less than or equal to about 50 wt %, less than or equal to about 45 wt %, less than or equal to about 40 wt %, less than or equal to about 35 wt %, less than or equal to about 30 wt %, less than or equal to about 25 wt %, less than or equal to about 20 wt %, less than or equal to about 15 wt %, less than or equal to about 10 wt %, or less than or equal to about 5 wt %. Other ranges are also possible.

In embodiments in which a fiber web includes at least first and second layers, such as in the embodiment shown illustratively in FIG. 1, the weight percentage of fibrillated fibers in each of the layers may also vary. For example, in some embodiments, the weight percentage of fibrillated fibers in the first layer may be between about 0 wt % and about 100 wt %. In some embodiments, the weight percentage of fibrillated fibers in the first layer of the fiber web may be greater than or equal to about 2 wt %, greater than or equal to about 10 wt %, greater than or equal to about 20 wt %, greater than or equal to about 40 wt %, greater than or equal to about 60 wt %, or greater than or equal to about 80 wt %. In some embodiments, the weight percentage of the fibrillated fibers in the first layer may be less than or equal to about 100 wt %, less than or equal to about 80 wt %, less than or equal to about 40 wt %, less than or equal to about 20 wt %, less than or equal to about 10 wt %, or less than or equal to about 5 wt %. Combinations of the above-referenced ranges are also possible (e.g., a weight percentage of greater than about 2 wt % and less than or equal to about 100 wt %). Other ranges are also possible.

In some embodiments, the weight percentage of fibrillated fibers in the second layer may be between about 0 wt % and about 100 wt %. In some embodiments, the weight percentage of fibrillated fibers in the second layer of the fiber web may be greater than or equal to about 1 wt %, greater than or equal to about 2 wt %, greater than or equal to about 5 wt %, greater than or equal to about 10 wt %, greater than or equal to about 20 wt %, greater than or equal to about 30 wt %, greater than or equal to about 40 wt %, greater than or equal to about 50 wt %, greater than or equal to about 60 wt %, greater than or equal to about 70 wt %, greater than or equal to about 80 wt %, or greater than or equal to about 90 wt %. In some embodiments, the weight percentage of the fibrillated fibers in the second layer may be less than or equal to about 100 wt %, less than or equal to about 90 wt %, less than or equal to about 80 wt %, less than or equal to about 70 wt %, less than or equal to about 60 wt %, less than or equal to about 50 wt %, less than or equal to about 40 wt %, less than or equal to about 30 wt %, less than or equal to about 20 wt %, less than or equal to about 15 wt %, less than or equal to about 10 wt %, or less than or equal to about 5 wt %. Combinations of the above-referenced ranges are also possible (e.g., a weight percentage of greater than about 5 wt % and less than or equal to about 100 wt %). Other ranges are also possible.

As noted above, the amount of fibrillated fibers and the level of fibrillation may vary between fiber web layers of the filter media. For example, the relative amount of fibrillated fibers and the level of fibrillation may vary when a first layer of a filter media is an upstream layer and a second layer of the filter media is a downstream layer. In some embodiments, an upstream layer has a lesser degree of fibrillation (i.e., greater average CSF) than a downstream layer. In other embodiments, an upstream layer has a greater degree of fibrillation than a downstream layer. In some embodiments, the percentage of fibrillated fibers in an upstream layer is comparatively smaller than the percentage of fibrillated fibers in a downstream layer. In other embodiments, the percentage of fibrillated fibers in an upstream layer is greater than the percentage of fibrillated fibers in a downstream layer.

In certain embodiments in which a fiber web including at least first and second layers, the second layer may include more fibrillated fibers than the first layer (e.g., at least 10%, at least 20%, at least 40%, at least 60%, at least 80%, at least 100%, at least 150%, at least 200%, at least 300%, at least 400%, at least 500%, or at least 1000% more fibrillated fibers than the first layer). In other embodiments, the first layer may include more fibrillated fibers than the second layer (e.g., at least 10%, at least 20%, at least 40%, at least 60%, at least 80%, at least 100%, at least 150%, at least 200%, at least 300%, at least 400%, at least 500%, or at least 1000% more fibrillated fibers than the second layer). Other ranges are also possible. In some cases, the same amount of fibrillated fibers are present in each of the layers. Gradients of amounts of fibrillated fibers may also be present across the thickness of the fiber web.

In some embodiments in which a fiber web including at least first and second layers, the second layer may include fibrillated fibers having a higher average level of fibrillation than the fibrillated fibers of the first layer. For example, the average CSF value of the fibrillated fibers of the second layer may be at least 10%, at least 20%, at least 40%, at least 60%, at least 80%, at least 100%, at least 150%, at least 200%, at least 300%, at least 400%, or at least 500% greater than the average CSF value of the fibrillated fibers of the first layer. In other embodiments, the first layer may include fibrillated fibers having a higher average level of fibrillation than the fibrillated fibers of the second layer. For example, the average CSF value of the fibrillated fibers of the first layer may be at least 10%, at least 20%, at least 40%, at least 60%, at least 80%, at least 100%, at least 150%, at least 200%, at least 300%, at least 400%, or at least 500% greater than the average CSF value of the fibrillated fibers of the second layer. Other ranges are also possible. In some cases, the fibrillated fibers in each of the layers has the same level of fibrillation. Gradients of average levels of fibrillation may also be present across the thickness of the fiber web.

In some cases, it may be advantageous for the fibrillated fibers to be aligned in the machine direction of the web (i.e., when a fiber's length extends substantially in the machine direction) and/or in the cross-machine direction of the web (i.e., when a fiber's length extends substantially in the cross-machine direction). It should be understood that the terms "machine direction" and "cross-machine" direction have their usual meanings in the art. That is, the machine direction refers to the direction in which the fiber web moves along the processing machine during processing and the cross-machine direction refers to a direction perpendicular to the machine direction.

In some embodiments, the fiber webs described herein may include cellulose fibers. As described herein, the cellulose fibers may be fibrillated or non-fibrillated. Mixtures of fibrillated and non-fibrillated cellulose fibers are also possible. The cellulose fibers may include any suitable type of cellulose fibers such as softwood fibers, hardwood fibers, and mixtures thereof. Moreover, the cellulose fibers may include natural cellulose fibers, synthetic cellulose fibers (e.g., regenerated cellulose), or mixtures thereof.

The fiber web may include a suitable percentage of cellulose fibers. For example, in some embodiments, the weight percentage of cellulose fibers in the fiber web may be between about 0 wt % and about 100 wt %. In some embodiments, the weight percentage of cellulose fibers in the fiber web may be greater than or equal to about 5 wt %, greater than or equal to about 10 wt %, greater than or equal to about 30 wt %, greater than or equal to about 50 wt %, greater than or equal to about 70 wt %, greater than or equal to about 80 wt %, greater than or equal to about 90 wt %, greater than or equal to about 95 wt %, or greater than or equal to about 98 wt %. In some embodiments, the weight percentage of the cellulose fibers in the fiber web may be less than or equal to about 100 wt %, less than or equal to about 98 wt %, less than or equal to about 95 wt %, less than or equal to about 90 wt %, less than or equal to about 80 wt %, less than or equal to about 70 wt %, less than or equal to about 50 wt %, less than or equal to about 40 wt %, less than or equal to about 20 wt %, less than or equal to about 10 wt %, or less than or equal to about 5 wt %. Combinations of the above-referenced ranges are also possible (e.g., a weight percentage of greater than about 5 wt % and less than or equal to about 80 wt %). Other ranges are also possible. In some embodiments, a fiber web includes 0 wt % of cellulose fibers. In other embodiments, a fiber web includes 100 wt % of cellulose fibers.

In embodiments in which the fiber web includes at least first and second layers, such as in the embodiment shown illustratively in FIG. 1, the weight percentage of cellulose fibers in each of the layers may also vary. For example, in some embodiments, the weight percentage of cellulose fibers in the first layer of the fiber web may be between about 0 wt % and about 100 wt %. In some embodiments, the weight percentage of cellulose fibers in the first layer of the fiber web may be greater than or equal to about 10 wt %, greater than or equal to about 30 wt %, greater than or equal to about 50 wt %, greater than or equal to about 70 wt %, greater than or equal to about 80 wt %, greater than or equal to about 90 wt %, or greater than or equal to about 95 wt %. In some embodiments, the weight percentage of cellulose fibers in the first layer of the fiber web may be less than or equal to about 100 wt %, less than or equal to about 95 wt %, less than or equal to about 90 wt %, less than or equal to about 80 wt %, less than or equal to about 70 wt %, less than or equal to about 50 wt %, or less than or equal to about 40 wt %, less than or equal to about 20 wt %, or less than or equal to about 10 wt %. Combinations of the above-referenced ranges are also possible (e.g., a weight percentage of greater than about 5 wt % and less than or equal to about 80 wt %). Other ranges are also possible. In some embodiments, the first layer of the fiber web includes 0 wt % of cellulose fibers. In other embodiments, the first layer of the fiber web includes 100 wt % of cellulose fibers.

In some embodiments, the weight percentage of cellulose fibers in the second layer of the fiber web may be between about 0 wt % and about 100 wt %. In some embodiments, the weight percentage of cellulose fibers in the second layer of the fiber web may be greater than or equal to about 5 wt %, greater than or equal to about 10 wt %, greater than or equal to about 30 wt %, greater than or equal to about 50 wt %, greater than or equal to about 70 wt %, greater than or equal to about 80 wt %, greater than or equal to about 90 wt %, or greater than or equal to about 95 wt %. In some embodiments, the weight percentage of cellulose fibers in the second layer of the fiber web may be less than or equal to about 100 wt %, less than or equal to about 95 wt %, less than or equal to about 90 wt %, less than or equal to about 80 wt %, less than or equal to about 70 wt %, less than or equal to about 50 wt %, or less than or equal to about 40 wt %, less than or equal to about 20 wt %, or less than or equal to about 10 wt %. Combinations of the above-referenced ranges are also possible (e.g., a weight percentage of greater than about 5 wt % and less than or equal to about 80 wt %). Other ranges are also possible. In some embodiments, the second layer of the fiber web includes 0 wt % of cellulose fibers. In other embodiments, the second layer of the fiber web includes 100 wt % of cellulose fibers.

A fiber web may include any suitable amount of hardwood and/or softwood fibers, which may be fibrillated or non-fibrillated. Mixtures of fibrillated and non-fibrillated hardwood and/or softwood fibers are also possible.

In some embodiments, the weight percentage of hardwood fibers in the fiber web may be between about 0 wt % and about 98 wt %. In some embodiments, the weight percentage of hardwood fibers in the fiber web may be greater than or equal to about 5 wt %, greater than or equal to about 10 wt %, greater than or equal to about 30 wt %, greater than or equal to about 50 wt %, greater than or equal to about 70 wt %, greater than or equal to about 80 wt %, greater than or equal to about 90 wt %, or greater than or equal to about 98 wt %. In some embodiments, the weight percentage of the hardwood fibers in the fiber web may be less than or equal to about 98 wt %, less than or equal to about 90 wt %, less than or equal to about 80 wt %, less than or equal to about 70 wt %, less than or equal to about 50 wt %, less than or equal to about 40 wt %, less than or equal to about 20 wt %, less than or equal to about 10 wt %, or less than or equal to about 5 wt %. Combinations of the above-referenced ranges are also possible (e.g., a weight percentage of greater than about 5 wt % and less than or equal to about 90 wt %). Other ranges are also possible. In some embodiments, a fiber web includes 0 wt % of hardwood fibers.

In embodiments in which the fiber web includes at least first and second layers, such as in the embodiment shown illustratively in FIG. 1, the weight percentage of hardwood fibers in each of the layers may also vary. For example, in some embodiments, the weight percentage of hardwood fibers in the first layer of the fiber web may be between about 0 wt % and about 100 wt %. In some embodiments, the weight percentage of hardwood fibers in the first layer of the fiber web may be greater than or equal to about 10 wt %, greater than or equal to about 30 wt %, greater than or equal to about 50 wt %, greater than or equal to about 70 wt %, or greater than or equal to about 80 wt %. In some embodiments, the weight percentage of hardwood fibers in the first layer of the fiber web may be less than or equal to about 95 wt %, less than or equal to about 90 wt %, less than or equal to about 80 wt %, less than or equal to about 70 wt %, less than or equal to about 50 wt %, or less than or equal to about 40 wt %, less than or equal to about 20 wt %, or less than or equal to about 10 wt %. Combinations of the above-referenced ranges are also possible (e.g., a weight percentage of greater than about 5 wt % and less than or equal to about 80 wt %). Other ranges are also possible.

In some embodiments, the weight percentage of hardwood fibers in the second layer of the fiber web may be between about 0 wt % and about 100 wt %. In some embodiments, the weight percentage of hardwood fibers in the second layer of the fiber web may be greater than or equal to about 5 wt %, greater than or equal to about 10 wt %, greater than or equal to about 30 wt %, greater than or equal to about 50 wt %, greater than or equal to about 70 wt %, or greater than or equal to about 80 wt %. In some embodiments, the weight percentage of hardwood fibers in the second layer of the fiber web may be less than or equal to about 95 wt %, less than or equal to about 90 wt %, less than or equal to about 80 wt %, less than or equal to about 70 wt %, less than or equal to about 50 wt %, or less than or equal to about 40 wt %, less than or equal to about 20 wt %, or less than or equal to about 10 wt %. Combinations of the above-referenced ranges are also possible (e.g., a weight percentage of greater than about 5 wt % and less than or equal to about 80 wt %). Other ranges are also possible.

The weight percentage of softwood fibers in the fiber web may also vary. For example, the weight percentage of softwood fibers in the fiber web may be between about 0 wt % and about 98 wt %. In some embodiments, the weight percentage of softwood fibers in the fiber web may be greater than or equal to about 5 wt %, greater than or equal to about 10 wt %, greater than or equal to about 30 wt %, greater than or equal to about 50 wt %, greater than or equal to about 70 wt %, greater than or equal to about 80 wt %, greater than or equal to about 90 wt %, or greater than or equal to about 98 wt %. In some embodiments, the weight percentage of the softwood fibers in the fiber web may be less than or equal to about 98 wt %, less than or equal to about 90 wt %, less than or equal to about 80 wt %, less than or equal to about 70 wt %, less than or equal to about 50 wt %, less than or equal to about 40 wt %, less than or equal to about 20 wt %, less than or equal to about 10 wt %, or less than or equal to about 5 wt %. Combinations of the above-referenced ranges are also possible (e.g., a weight percentage of greater than about 5 wt % and less than or equal to about 80 wt %). Other ranges are also possible. In some embodiments, a fiber web includes 0 wt % of softwood fibers.

In embodiments in which the fiber web includes at least first and second layers, such as in the embodiment shown illustratively in FIG. 1, the weight percentage of softwood fibers in each of the layers may also vary. For example, in some embodiments, the weight percentage of softwood fibers in the first layer of the fiber web may be between about 0 wt % and about 100 wt %. In some embodiments, the weight percentage of softwood fibers in the first layer of the fiber web may be greater than or equal to about 10 wt %, greater than or equal to about 30 wt %, greater than or equal to about 50 wt %, greater than or equal to about 70 wt %, or greater than or equal to about 80 wt %. In some embodiments, the weight percentage of softwood fibers in the first layer of the fiber web may be less than or equal to about 95 wt %, less than or equal to about 90 wt %, less than or equal to about 80 wt %, less than or equal to about 70 wt %, less than or equal to about 50 wt %, or less than or equal to about 40 wt %, less than or equal to about 20 wt %, or less than or equal to about 10 wt %. Combinations of the above-referenced ranges are also possible (e.g., a weight percentage of greater than about 5 wt % and less than or equal to about 80 wt %). Other ranges are also possible.

In some embodiments, the weight percentage of softwood fibers in the second layer of the fiber web may be between about 0 wt % and about 100 wt %. In some embodiments, the weight percentage of softwood fibers in the second layer of the fiber web may be greater than or equal to about 5 wt %, greater than or equal to about 10 wt %, greater than or equal to about 30 wt %, greater than or equal to about 50 wt %, greater than or equal to about 70 wt %, or greater than or equal to about 80 wt %. In some embodiments, the weight percentage of softwood fibers in the second layer of the fiber web may be less than or equal to about 95 wt %, less than or equal to about 90 wt %, less than or equal to about 80 wt %, less than or equal to about 70 wt %, less than or equal to about 50 wt %, or less than or equal to about 40 wt %, less than or equal to about 20 wt %, or less than or equal to about 10 wt %. Combinations of the above-referenced ranges are also possible (e.g., a weight percentage of greater than about 5 wt % and less than or equal to about 80 wt %). Other ranges are also possible.

In some embodiments, the fiber webs described herein include one or more synthetic fibers. As described herein, the synthetic fibers may be fibrillated or non-fibrillated. Synthetic fibers may include any suitable type of synthetic polymer. Examples of suitable non-fibrillated synthetic fibers include polyesters (e.g., polyethylene terephthalate, polybutylene terephthalate), polyamide, polyaramid, para-aramid, meta-aramid, polyaniline, polyimide, polyethylene, polypropylene, polyether ether ketone, polyolefin, nylon, acrylics, polyvinyl alcohol, regenerated cellulose (e.g., lyocell, rayon), cellulose acetate, polyvinylidene fluoride, poly (vinylidene fluoride-co-hexafluoropropylene), polyacrylonitriles, polysulfones (e.g., polyether sulfones, poly(phenylene ether sulfone)), polystyrene, polybutadiene, polyurethane, polyphenylene oxide, polycarbonate, poly(methyl methacrylate), polyhydroxyethylmethacrylate, poly(lactic acid) or polylactide, silk, poly (4-methyl-1-pentene), polypyrrole, and combinations thereof. In some embodiments, one or more fibers can include copolymers of the above (e.g., block copolymers of polystyrene-polybutadiene). In some embodiments, the synthetic fibers are organic polymer fibers.

Synthetic fibers may also include multi-component fibers (i.e., fibers having multiple compositions such as bi-component fibers) including one or more of the polymers described above. For example, islands in the sea fibers may be used. In some cases, synthetic fibers may include meltblown fibers, which may be formed of fibers described herein (e.g., polyester, polypropylene). In other cases, synthetic fibers may be electrospun fibers. In yet other embodiments, the synthetic fibers may be centrifugal spun fibers or melt-spun fibers.

The fiber web, as well as the first and/or second layers of the fiber web, may also include combinations of more than one type of synthetic fiber. It should be understood that other types of synthetic fiber types may also be used.

A fiber web may include a suitable percentage of synthetic fibers. For example, in some embodiments, the weight percentage of synthetic fibers in the fiber web may be between about 0 wt % and about 100 wt %. In some embodiments, the weight percentage of synthetic fibers in the fiber web may be greater than or equal to about 5 wt %, greater than or equal to about 10 wt %, greater than or equal to about 30 wt %, greater than or equal to about 50 wt %, greater than or equal to about 70 wt %, greater than or equal to about 80 wt %, greater than or equal to about 90 wt %, or greater than or equal to about 95 wt %. In some embodiments, the weight percentage of the synthetic fibers in the fiber web may be less than or equal to about 100 wt %, less than or equal to about 95 wt %, less than or equal to about 90 wt %, less than or equal to about 80 wt %, less than or equal to about 70 wt %, less than or equal to about 50 wt %, less than or equal to about 40 wt %, less than or equal to about 20 wt %, or less than or equal to about 10 wt %. Combinations of the above-referenced ranges are also possible (e.g., a weight percentage of greater than about 50 wt % and less than or equal to about 100 wt %). Other ranges are also possible. In some embodiments, a fiber web includes 100 wt % of synthetic fibers. In other embodiments, a fiber web includes 0 wt % of synthetic fibers.

In certain embodiments, the fiber web includes one or more inorganic fibers. Inorganic fibers may include, for example, ceramic fibers such as oxides (e.g., alumina, titania, tin oxide, zinc oxide). Mineral fibers can also be included in the fiber web. Inorganic fibers may also include metal fibers such as stainless steel fibers, nickel-coated fibers, and copper-coated fibers.

In embodiments in which the fiber web includes at least first and second layers, such as in the embodiment shown illustratively in FIG. 1, the weight percentage of synthetic fibers in each of the layers may also vary. For example, in some embodiments, the weight percentage of synthetic fibers in the first layer of the fiber web may be between about 0 wt % and about 100 wt %. In some embodiments, the weight percentage of synthetic fibers in the first layer of the fiber web may be greater than or equal to about 10 wt %, greater than or equal to about 30 wt %, greater than or equal to about 50 wt %, greater than or equal to about 70 wt %, or greater than or equal to about 80 wt %, greater than or equal to about 90 wt %, or greater than or equal to about 95 wt %. In some embodiments, the weight percentage of synthetic fibers in the first layer of the fiber web may be less than or equal to about 100 wt %, less than or equal to about 95 wt %, less than or equal to about 90 wt %, less than or equal to about 80 wt %, less than or equal to about 70 wt %, less than or equal to about 50 wt %, or less than or equal to about 40 wt %, less than or equal to about 20 wt %, or less than or equal to about 10 wt %. Combinations of the above-referenced ranges are also possible (e.g., a weight percentage of greater than about 50 wt % and less than or equal to about 100 wt %). Other ranges are also possible. In some embodiments, the first layer of the fiber web includes 0 wt % of synthetic fibers. In other embodiments, the first layer of the fiber web includes 100 wt % of synthetic fibers.

In some embodiments, the weight percentage of synthetic fibers in the second layer of the fiber web may be between about 0 wt % and about 100 wt %. In some embodiments, the weight percentage of synthetic fibers in the second layer of the fiber web may be greater than or equal to about 10 wt %, greater than or equal to about 30 wt %, greater than or equal to about 50 wt %, greater than or equal to about 70 wt %, or greater than or equal to about 80 wt %, greater than or equal to about 90 wt %, or greater than or equal to about 95 wt %. In some embodiments, the weight percentage of synthetic fibers in the second layer of the fiber web may be less than or equal to about 100 wt %, less than or equal to about 95 wt %, less than or equal to about 90 wt %, less than or equal to about 80 wt %, less than or equal to about 70 wt %, less than or equal to about 50 wt %, or less than or equal to about 40 wt %, less than or equal to about 20 wt %, or less than or equal to about 10 wt %. Combinations of the above-referenced ranges are also possible (e.g., a weight percentage of greater than about 50 wt % and less than or equal to about 100 wt %). Other ranges are also possible. In some embodiments, the second layer of the fiber web includes 100 wt % of synthetic fibers.

The fiber webs described herein may also include non-fibrillated synthetic fibers (e.g., staple fibers); that is, synthetic fibers that are not fibrillated. Synthetic fibers, as noted above, are non-naturally occurring fibers formed of polymeric materials. Non-fibrillated synthetic fibers include any suitable type of synthetic polymer including thermoplastic polymers and those polymers described herein for synthetic fibers generally. Examples of suitable non-fibrillated synthetic fibers include polyester, polyamide, polyaramid, polyimide, polyethylene, polypropylene, polyether ether ketone, polyethylene terephthalate, polyolefin, nylon, and combinations thereof. It should be understood that other types of non-fibrillated synthetic fiber types may also be used.

In general, non-fibrillated synthetic fibers may have any suitable dimensions. For instance, non-fibrillated synthetic fibers may have an average diameter of between about 2 microns and about 50 microns, between about 2 microns and about 20 microns, between about 4 microns and about 7 microns, or between about 3 microns and about 7 microns. In some embodiments, the non-fibrillated synthetic fibers may have an average diameter of greater than or equal to about 1 micron, greater than or equal to about 2 microns, greater than or equal to about 4 microns, greater than or equal to about 6 microns, greater than or equal to about 8 microns, greater than or equal to about 10 microns, greater than or equal to about 12 microns, greater than or equal to about 15 microns, greater than or equal to about 20 microns, greater than or equal to about 30 microns, or greater than or equal to about 40 microns. In some cases, the non-fibrillated synthetic fibers may have an average diameter of less than or equal to about 50 microns, less than or equal to about 40 microns, less than or equal to about 30 microns, less than or equal to about 20 microns, less than or equal to about 15 microns, less than or equal to about 12 microns, less than or equal to about 10 microns, than or equal to about 8 microns, less than or equal to about 6 microns, less than equal to about 4 microns, or less than or equal to about 2 microns. Combinations of the above referenced ranges are also possible (e.g., an average diameter of greater than or equal to about 2 microns and less than about 10 microns). Other ranges are also possible.

In some embodiments, fiber webs having non-fibrillated synthetic fibers with a greater average diameter may exhibit a higher degree of permeability than fiber webs having non-fibrillated synthetic fibers with a comparatively smaller average diameter. The non-fibrillated synthetic fibers described may have an average length of between about 3 mm and about 12 mm, between about 4 mm and about 6 mm, or between about 5 mm and about 7 mm. In some embodiments, fiber webs having non-fibrillated synthetic fibers with a greater average length may exhibit a higher degree of tensile strength than fiber webs having non-fibrillated synthetic fibers with a comparatively smaller average length. It should be understood that, in certain embodiments, non-fibrillated synthetic fibers may have dimensions outside the above-noted ranges.

In some embodiments, non-fibrillated synthetic fibers may be staple fibers, which may be synthetic fibers that are cut or formed as non-continuous discrete fibers to have a suitable average length and are appropriate for incorporation into a wet-laid or non-wet laid (e.g., dry-laid, air laid) process for forming a fiber web. In some cases, groups of staple fibers may be cut to have a particular length with only slight variations in length between individual fibers.

In some embodiments, non-fibrillated synthetic fibers may be binder fibers. Non-fibrillated synthetic fibers may be mono-component (i.e., having a single composition, such a polyvinyl alcohol or other polymers described herein) or multi-component (i.e., having multiple compositions such as bi-component fiber). Combinations of different non-fibrillated synthetic fibers are also possible.

In some embodiments, the fiber web may include a suitable percentage of mono-component fibers and/or multi-component fibers. In some embodiments, all of the non-fibrillated synthetic fibers are mono-component fibers. In some embodiments, at least a portion of the non-fibrillated synthetic fibers are multi-component fibers.

An example of a multi-component fiber is a bi-component fiber which includes a first material and a second material that is different from the first material. The different components of a multi-component fiber may exhibit a variety of spatial arrangements. For example, multi-component fibers may be arranged in a core-sheath configuration (e.g., a first material may be a sheath material that surrounds a second material which is a core material), a side by side configuration (e.g., a first material may be arranged adjacent to a second material), a segmented pie arrangement (e.g., different materials may be arranged adjacent to one another in a wedged configuration), a tri-lobal arrangement (e.g., a tip of a lobe may have a material different from the lobe) and an arrangement of localized regions of one component in a different component (e.g., "islands in sea").

In some embodiments, for a core-sheath configuration, a multi-component fiber, such as a bi-component fiber, may include a sheath of a first material that surrounds a core comprising a second material. In such an arrangement, for some embodiments, the melting point of the first material may be lower than the melting point of the second material. Accordingly, at a suitable step during manufacture of a fiber web (e.g., drying), the first material comprising the sheath may be melted (e.g., may exhibit a phase change) while the second material comprising the core remains unaltered (e.g., may exhibit no phase change). For instance, an outer sheath portion of a multi-component fiber may have a melting temperature between about 50° C. and about 200° C. (e.g., 180° C.) and an inner core of the multi-component fiber may have a melting temperature above 200° C. As a result, when the fiber is subjected to a temperature during drying, e.g., at 180° C., then the outer sheath of the fiber may melt while the core of the fiber does not melt.

A fiber web may include a suitable percentage of non-fibrillated synthetic fibers. For example, in some embodiments, the weight percentage of non-fibrillated synthetic fibers in the fiber web may be between about 0 wt % and about 98 wt %. In some embodiments, the weight percentage of non-fibrillated synthetic fibers in the fiber web may be greater than or equal to about 5 wt %, greater than or equal to about 10 wt %, greater than or equal to about 30 wt %, greater than or equal to about 50 wt %, greater than or equal to about 70 wt %, or greater than or equal to about 80 wt %. In some embodiments, the weight percentage of the non-fibrillated synthetic fibers in the fiber web may be less than or equal to about 95 wt %, less than or equal to about 90 wt %, less than or equal to about 80 wt %, less than or equal to about 70 wt %, less than or equal to about 50 wt %, less than or equal to about 40 wt %, less than or equal to about 20 wt %, or less than or equal to about 10 wt %. Combinations of the above-referenced ranges are also possible (e.g., a weight percentage of greater than about 5 wt % and less than or equal to about 80 wt %). Other ranges are also possible. In some embodiments, a fiber web includes 0 wt % of non-fibrillated synthetic fibers.

In embodiments in which the fiber web includes at least first and second layers, such as in the embodiment shown illustratively in FIG. 1, the weight percentage of non-fibrillated synthetic fibers (e.g., staple fibers) in each of the layers may also vary. For example, in some embodiments, the weight percentage of non-fibrillated synthetic fibers in the first layer of the fiber web may be between about 0 wt % and about 100 wt %. In some embodiments, the weight percentage of non-fibrillated synthetic fibers in the first layer of the fiber web may be greater than or equal to about 10 wt %, greater than or equal to about 30 wt %, greater than or equal to about 50 wt %, greater than or equal to about 70 wt %, or greater than or equal to about 80 wt %. In some embodiments, the weight percentage of non-fibrillated synthetic fibers in the first layer of the fiber web may be less than or equal to about 95 wt %, less than or equal to about 90 wt %, less than or equal to about 80 wt %, less than or equal to about 70 wt %, less than or equal to about 50 wt %, or less than or equal to about 40 wt %, less than or equal to about 20 wt %, or less than or equal to about 10 wt %. Combinations of the above-referenced ranges are also possible (e.g., a weight percentage of greater than about 5 wt % and less than or equal to about 80 wt %). Other ranges are also possible. In some embodiments, the first layer of the fiber web includes 0 wt % of non-fibrillated synthetic fibers. In other embodiments, the first layer of the fiber web includes 100 wt % of non-fibrillated synthetic fibers.

In some embodiments, the weight percentage of non-fibrillated synthetic fibers in the second layer of the fiber web may be between about 0 wt % and about 98 wt %. In some embodiments, the weight percentage of non-fibrillated synthetic fibers in the second layer of the fiber web may be greater than or equal to about 10 wt %, greater than or equal to about 30 wt %, greater than or equal to about 50 wt %, greater than or equal to about 70 wt %, or greater than or equal to about 80 wt %. In some embodiments, the weight percentage of non-fibrillated synthetic fibers in the second layer of the fiber web may be less than or equal to about 95 wt %, less than or equal to about 90 wt %, less than or equal to about 80 wt %, less than or equal to about 70 wt %, less than or equal to about 50 wt %, or less than or equal to about 40 wt %, less than or equal to about 20 wt %, or less than or equal to about 10 wt %. Combinations of the above-referenced ranges are also possible (e.g., a weight percentage of greater than about 5 wt % and less than or equal to about 80 wt %). Other ranges are also possible. In some embodiments, the second layer of the fiber web includes 0 wt % of non-fibrillated synthetic fibers.

In some embodiments, the fiber web may include multiple types of non-fibrillated synthetic fibers.

The fiber web may include limited amounts of, if any, glass fibers. For example, the weight percentage of glass fiber in the fiber web may be between about 0 wt % and about 20 wt % (e.g., between about 0 wt % and about 10 wt %, between 0 wt % and about 5 wt %, between 0 wt % and about 2 wt %, or between 0 wt % and about 1 wt %). In some embodiments, the weight percentage of glass fibers in the fiber web may be less than or equal to about 20 wt %, less than or equal to about 15 wt %, less than or equal to about 10 wt %, less than or equal to about 8 wt %, less than or equal to about 6 wt %, less than or equal to about 5 wt %, less than or equal to about 4 wt %, less than or equal to about 2 wt %, or less than or equal to about 1 wt %. Other ranges are also possible. When the fiber web includes less than 1 wt % of glass fiber, it is considered that the fiber web is substantially free of glass fiber.

In embodiments in which the fiber web includes at least first and second layers, such as in the embodiment shown illustratively in FIG. 1, the weight percentage of glass fibers in each of the layers may also vary. For example, in some embodiments, the weight percentage of glass fibers in the first layer of the fiber web may be between about 0 wt % and about 20 wt % (e.g., between about 0 wt % to about 10 wt %, between 0 wt % to about 5 wt %, between 0 wt % to about 2 wt %, or between 0 wt % to about 1 wt %). In some embodiments, the weight percentage of glass fibers in the first layer of the fiber web may be less than or equal to about 20 wt %, less than or equal to about 15 wt %, less than or equal to about 10 wt %, less than or equal to about 8 wt %, less than or equal to about 6 wt %, less than or equal to about 5 wt %, less than or equal to about 4 wt %, less than or equal to about 2 wt %, or less than or equal to about 1 wt %. In some cases, the first layer includes 0 wt % of glass fibers. Other ranges are also possible.

In some embodiments, the weight percentage of glass fibers in the second layer of the fiber web may be between about 0 wt % and about 20 wt % (e.g., between about 0 wt % to about 10 wt %, between 0 wt % to about 5 wt %, between 0 wt % to about 2 wt %, or between 0 wt % to about 1 wt %). In some embodiments, the weight percentage of glass fibers in the second layer of the fiber web may be less than or equal to about 20 wt %, less than or equal to about 15 wt %, less than or equal to about 10 wt %, less than or equal to about 8 wt %, less than or equal to about 6 wt %, less than or equal to about 5 wt %, less than or equal to about 4 wt %, less than or equal to about 2 wt %, or less than or equal to about 1 wt %. In some cases, the second layer includes 0 wt % of glass fibers. Other ranges are also possible.

In some cases, a fiber web having limited amounts of, if any, glass fibers when used with various machine or engine parts may result in a marked decrease in abrasion and wear as compared to a fiber web having substantially more glass fibers incorporated therein. Limited amounts or absence of glass fibers may also reduce the amount of fiber shedding from the fiber media during installation or use. Accordingly, using fiber webs that include little to no glass fibers therein may alleviate the necessity of having a protective scrim that may be otherwise be installed downstream from the filter media.

As described above, a fiber web may include an additional layer (e.g., a third layer, a fourth layer, . . . a tenth layer, etc.). The additional layer may be positioned upstream or downstream of the first layer, or upstream or downstream of the second layer. In some cases, an additional layer may be positioned between a first layer and a second layer. Moreover, more than one additional layers (e.g., up to 10 layers), which may be the same or different from one another, may be included in a fiber web at various positions with respect to the first or second layers.

Although other ranges are possible, in certain embodiments the additional layer may have a basis weight of between about 5 g/m² and about 800 g/m², an air permeability of less than about 1300 cfm/sf, and an average fiber diameter of less than 100 microns. In some embodiments, the additional layer may be used to enhance one or more of dust holding capacity, lifetime, liquid filtration efficiency, water separation efficiency, and/or strength (e.g., Mullen burst strength, tensile strength, elongation) of the fiber web, although other uses for the additional layer are possible.

In some embodiments, an additional layer that may be used to enhance dust holding capacity of the fiber web may have, for example, a basis weight of less than or equal to 300 g/m², an air permeability of less than or equal to 700 cfm/sf, and an average fiber diameter of less than or equal to 20 microns, although other ranges are also possible.

In some embodiments, an additional layer that may be used to enhance efficiency of the fiber web may have, for example, a basis weight of less than or equal to 100 g/m², an air permeability of less than or equal to 700 cfm/sf, and an average fiber diameter of less than or equal to 4 microns, although other ranges are also possible.

In some embodiments, an additional layer that may be used to enhance water separation efficiency (e.g., fuel-water separation efficiency) of the fiber web may have, for example, a basis weight of less than or equal to 800 g/m², an air permeability of less than or equal to 1300 cfm/sf, and an average fiber diameter of less than or equal to 50 microns, although other ranges are also possible.

The additional layer may be formed of any suitable fibers and the layer may be non-woven or woven. In some cases, the additional layer is non-wet laid and includes non-wet laid fibers, e.g., meltblown fibers, meltspun fibers, dry laid (carded) fibers, centrifugal spun fibers, spunbond fibers, and/or air laid fibers. In some cases, the additional layer includes continuous fibers. In other cases, the additional layer includes staple fibers (e.g., fibers having a length of between about 1 mm and about 55 mm). In some embodiments, the additional layer does not include any fibrillated fibers, although fibrillated fibers may be included in other embodiments. The materials used to form the fibers of the additional layer may include the ones described herein (e.g., synthetic, organic, and/or inorganic materials).

An additional layer may be in the form of a mesh in some cases. The mesh may be formed of any suitable materials such as the ones described herein (e.g., synthetic, organic, and/or inorganic materials). Additionally, metals such as stainless steel may be used. The mesh may have an suitable average opening size, such as between about 0.001 mm and about 7 mm (e.g., at least about 0.001 mm, at least about 0.01 mm, at least about 0.1 mm, at least about 1 mm, at least about 3 mm, or at least about 5 mm and/or less than or equal to about 7 mm, less than or equal to about 4 mm, less than or equal to about 2 mm, less than or equal to about 1 mm). Other ranges are also possible.

In general, the fibers of an additional layer may have any suitable dimensions. For instance, fibers of an additional layer may have an average diameter of between about 100 nm and about 100 microns (e.g., between about 100 nm and about 50 microns, between about 100 nm and about 4 microns, between about 1 micron and about 20 microns, or between about 1 micron and about 50 microns). In some embodiments, the additional layer may have an average diameter of greater than or equal to about 100 nm, greater than or equal to about 1 micron, greater than or equal to about 2 microns, greater than or equal to about 4 microns, greater than or equal to about 10 microns, greater than or equal to about 15 microns, greater than or equal to about 20 microns, greater than or equal to about 30 microns, or greater than or equal to about 40 microns. In some cases, the fibers of an additional layer may have an average diameter of less than or equal to about 50 microns, less than or equal to about 40 microns, less than or equal to about 30 microns, less than or equal to about 20 microns, less than or equal to about 15 microns, less than or equal to about 10 microns, less than or equal to about 8 microns, less than or equal to about 6 microns, less than equal to about 4 microns, or less than or equal to about 2 microns, or less than or equal to about 1 micron. Combinations of the above referenced ranges are also possible. Other ranges are also possible.

In some embodiments, the length of the fibers in an additional layer may vary between about 1 mm and about 20 cm (e.g., at least about 1 mm, at least about 5 mm, at least about 10 mm, at least about 50 mm, at least about 1 cm, at least about 5 cm, at least about 10 cm and/or less than or equal to about 20 cm, less than or equal to about 15 cm, less than or equal to about 10 cm, less than or equal to about 5 cm, less than or equal to about 1 cm, less than or equal to about 50 mm, less than or equal to about 20 mm, or less than or equal to about 10 mm). Other ranges are also possible. Continuous fibers may also be included.

In one set of embodiments, a filter media includes a first layer and/or a second layer in combination with an additional layer described herein. The first layer and/or second layer may be a wet laid layer (e.g., a layer formed by a wet laid process). The additional layer may be a non-wet laid layer (e.g., it may include meltblown fibers, meltspun fibers, centrifugal spun fibers, electrospun fibers, or fibers formed by other non-wet laid processes). Generally, the first and/or second layer includes a plurality of synthetic fibers and/or organic polymer fibers. For example, in one such embodiment, a filter media includes a first layer that comprises a plurality of organic polymer fibers, and a second layer that comprises a plurality of synthetic fibers. In some embodiments, at least one of the first and/or second layers includes fibrillated fibers in an amount described herein (e.g., between about 1 wt % and about 100 wt % of the first and/or second layers). Additionally, the first and/or second layers may comprise between about 0 wt % to about 10 wt % of glass fibers (e.g., the first and/or second layers may be substantially free of glass fibers). The first and/or second layers may be configured, in some embodiments, to have one or more of the following: a [mean flow pore (μm)/(permeability (cfm/sf))$^{0.5}$] value of less than about 3.0; a dust holding capacity of greater than or equal to about 80 g/m$^2$; and/or a liquid filtration efficiency of at least 98% for 4 microns or greater particles. The additional layer, which may be used to enhance one or more of dust holding capacity, lifetime, liquid filtration efficiency, water separation efficiency, and/or strength (e.g., Mullen burst strength, tensile strength, elongation) of the fiber web, may include synthetic polymer fibers. The additional layer may have, for example, a basis weight of between about 5 g/m$^2$ and about 800 g/m$^2$, an air permeability of less than about 100 cfm/sf, and an average fiber diameter of less than 100 microns. In some embodiments, the overall filter media may have an basis weight of greater than about 10 g/m$^2$ and less than or equal to about 1000 g/m$^2$, a thickness of between about 0.1 mm and about 10.0 mm. Advantageously, in some embodiments involving a filter media including a first layer, a second layer, and an additional layer, the filter media can achieve an efficiency at 4 microns of at least 99%, an initial efficiency of at least 99%, and a dust holding capacity of at least 150 gsm. Other performance values are also possible. In some embodiments, the filter media can achieve a fuel-water separation efficiency of at least about 30% (e.g., between about 60% to about 99.9%, between about 80% to about 99.9%, or between about 90% to about 99.9%).

In some embodiments, the fiber web may include a binder resin. The binder resin is not in fiber form and is to be distinguished from binder fiber (e.g., multi-component fiber) described above. In general, the binder resin may have any suitable composition. For example, the binder resin may comprise a thermoplastic (e.g., acrylic, polyvinylacetate, polyester, polyamide), a thermoset (e.g., epoxy, phenolic resin), or a combination thereof. In some cases, a binder resin includes one or more of a vinyl acetate resin, an epoxy resin, a polyester resin, a copolyester resin, a polyvinyl alcohol resin, an acrylic resin such as a styrene acrylic resin, and a phenolic resin. Other resins are also possible.

The amount of binder resin in a fiber web may vary. For example, the weight percentage of binder resin in the fiber web may be between 0 wt % and 45 wt %. In some embodiments, the weight percentage of binder resin in the fiber web may be greater than or equal to about 2 wt %, greater than or equal to about 5 wt %, greater than or equal to about 10 wt %, greater than or equal to about 15 wt %, greater than or equal to about 20 wt %, greater than or equal to about 25 wt %, greater than or equal to about 30 wt %, greater than or equal to about 35 wt %, or greater than or equal to about 40 wt % In some cases, the weight percentage of binder resin in the fiber web may be less than or equal to about 45 wt %, less than or equal to about 40 wt %, less than or equal to about 35 wt %, less than or equal to about 30 wt %, less than or equal to about 25 wt %, less than or equal to about 20 wt %, less than or equal to about 15 wt %, less than or equal to about 10 wt %, or less than or equal to about 5 wt %. Combinations of the above-referenced ranges are also possible (e.g., a weight percentage of binder resin of greater than or equal to about 5 wt % and less than about 35 wt %). Other ranges are also possible.

As described further below, the binder resin may be added to the fibers in any suitable manner including, for example, in the wet fiber web state. In some embodiments, the binder coats the fibers and is used to adhere fibers to each other to facilitate adhesion between the fibers. Any suitable method and equipment may be used to coat the fibers, for example, using curtain coating, gravure coating, melt coating, dip coating, knife roll coating, or spin coating, amongst others. In some embodiments, the binder is precipitated when added to the fiber blend. When appropriate, any suitable precipitating agent (e.g., Epichlorhydrin, fluorocarbon) may be provided to the fibers, for example, by injection into the blend. In some embodiments, upon addition to the fiber blend, the binder resin is added in a manner such that the fiber web is impregnated with the binder resin (e.g., the binder resin permeates throughout the fiber web). In other embodiments, a binder resin may be added to one side or both sides of a layer or web after the layer or web has been dried (e.g., after being formed using a wet laid process).

In a multi-layered web, a binder resin may be added to one or more, or each of the layers separately prior to combining the layers, or the binder resin may be added to the fiber web after combining the layers. In some embodiments, binder resin is added to the first and/or second layers, for example, by spraying or saturation impregnation (e.g., a solvent saturation process), or any of the above methods.

In some embodiments, a binder resin or binder mixture may be added to the first and/or second layers of a fiber web by a solvent saturation process. In certain embodiments, a polymeric material can be impregnated into the first and/or second layers either during or after the layers are being manufactured on a papermaking machine. For example, during a manufacturing process described herein, after the article containing first layer and second layer is formed and dried, a polymeric material in a water based emulsion or an organic solvent based solution can be adhered to an application roll and then applied to the article under a controlled pressure by using a size press or gravure saturator. The amount of the polymeric material impregnated into the article typically depends on the viscosity, solids content, and absorption rate of article.

As another example, after a fiber web is formed, it can be impregnated with a polymeric material by using a reverse roll applicator following the just-mentioned method and/or by using a dip and squeeze method (e.g., by dipping a dried filter media into a polymer emulsion or solution and then squeezing out the excess polymer by using a nip). A polymeric material can also be applied to a fiber web by other methods known in the art, such as spraying or foaming.

It should be understood that the fiber web may, or may not, include other components in addition to those described above. Typically, any additional components, are present in limited amounts, e.g., less than 5% by weight. For example, in some embodiments, the fiber web may include wet and dry strength additives or resins that include natural polymers (starches, gums), cellulose derivatives, such as carboxymethyl cellulose, methylcellulose, hemicelluloses, synthetic polymers such as phenolics, latexes, polyamides, polyacrylamides, urea-formaldehyde, melamine-formaldehyde, polyamides), surfactants, coupling agents, crosslinking agents, and/or conductive additives, amongst others.

Fiber webs described herein may be used in an overall filtration arrangement or filter element. In some embodiments, a fiber web includes at least a first layer and a second layer, with at least one of the layers including a fibrillated fiber. In some embodiments, one or more additional layers or components are included with the fiber web (e.g., disposed adjacent to the fiber web, contacting one or both sides of the fiber web). In some cases, the one or more additional layers may be formed predominantly of or entirely of non-fibrillated fibers, although in other embodiments, fibrillated fibers may be included. Non-limiting examples of additional layers include a meltblown layer, a wet laid layer, a coarse fiber electret media, a spunbond layer, or an electrospun layer. In some embodiments, multiple fiber webs comprising predominantly fibrillated fibers and non-fibrillated fibers in accordance with embodiments described herein may be layered together in forming a multi-layer sheet for use in a filter media or element.

As described herein, in some embodiments two or more layers of a web may be formed separately, and combined by any suitable method such as lamination, collation, or by use of adhesives. The two or more layers may be formed using different processes, or the same process. For example, each of the layers may be independently formed by a wet laid process, a non-wet laid process (e.g., a dry laid process, a spinning process, a meltblown process), or any other suitable process. In certain embodiments, the wet laid layers or non-wet laid layers can be formed on a scrim or other suitable substrate directly.

In some embodiments, two or more layers may be formed by the same process (e.g., a wet laid process, or a non-wet laid process such as a dry laid process, a spinning process, a meltblown process, or any other suitable process). In some instances, the two or more layers may be formed simultaneously. In some embodiments, a gradient in at least one property may be present across the thickness of the two or more layers.

In embodiments in which a fiber web includes a meltblown layer, the meltblown layer may have one or more characteristics described in commonly-owned U.S. Patent Publication No. 2009/0120048, entitled "Meltblown Filter Medium", which is based on U.S. patent application Ser. No. 12/266,892, filed on May 14, 2009, and commonly-owned U.S. Apl. No. 12/971,539, entitled "Fine Fiber Filter Media and Processes", filed on Dec. 17, 2010, each of which is incorporated herein by reference in its entirety for all purposes.

Different layers may be adhered together by any suitable method. For instance, layers may be adhered by an adhesive and/or melt-bonded to one another on either side. Lamination and calendering processes may also be used. In some embodiments, an additional layer may be formed from any type of fiber or blend of fibers via an added headbox or a coater and appropriately adhered to another layer.

The fiber webs (and resulting filter media) may have a variety of desirable properties and characteristics which are described in the following paragraphs.

The basis weight of the fiber web can vary depending on factors such as the strength requirements of a given filtering application, the materials used to form the filter media, as well as the desired level of filter efficiency and permissible levels of resistance or pressure drop. In certain embodiments described herein, some fiber webs may have a low basis weight while achieving advantageous filtration performance or mechanical characteristics. For example, a fiber web incorporating fibrillated fibers which provides for an enhanced surface area of the fiber web may have a lower basis weight without sacrificing strength.

The basis weight of the fiber web can typically be selected as desired. In some embodiments, the basis weight of the fiber web may range from between about 5 and about 1000 $g/m^2$. For instance, the basis weight of the fiber web may be between about 15 and about 400 $g/m^2$, between about 30 and about 300 $g/m^2$, between about 50 and about 200 $g/m^2$, between about 90 $g/m^2$ and about 200 $g/m^2$, between about 90 $g/m^2$ and about 150 $g/m^2$. In some embodiments, the basis weight of the fiber web may be greater than or equal to about 5 $g/m^2$ (e.g., greater than or equal to about 10 $g/m^2$, greater than or equal to about 40 $g/m^2$, greater than or equal to about 75 $g/m^2$, greater than or equal to about 100 $g/m^2$, greater than or equal to about 150 $g/m^2$, greater than or equal to about 200 $g/m^2$, greater than or equal to about 250 $g/m^2$, greater than or equal to about 300 g/m², greater than or equal to about 350 g/m², or greater than or equal to about 400 g/m²). In some cases, the basis weight of the fiber web may be less than or equal to about 1000 g/m² (e.g., less than or equal to about 700 g/m², less than or equal to about 500 g/m², less than or equal to about 400 g/m², less than or equal to about 350 g/m², less than or equal to about 300 g/m², less than or equal to about 250 g/m², less than or equal to about 200 g/m², less than or equal to about 150 g/m², less than or equal to about 100 g/m², less than or equal to about 75 g/m², or less than or equal to about 50 g/m²). Combinations of the above-referenced ranges are also possible (e.g., a basis weight of greater than about 40 g/m² and less than or equal to about 400 g/m²). Other ranges are also possible. As determined herein, the basis weight of the fiber web is measured according to the TAPPI T410Standard. Values are expressed in grams per square meter.

As described herein, in some embodiments a fiber web includes at least first and second layers, as shown illustratively in FIG. 1. In some such embodiments, the first layer may have a basis weight that ranges between about 5 and about 1000 g/m². For instance, the basis weight of the first layer may be greater than or equal to about 8 g/m² (e.g., greater than or equal to about 10 g/m², greater than or equal to about 40 g/m², greater than or equal to about 65 g/m², greater than or equal to about 75 g/m², greater than or equal to about 100 g/m², greater than or equal to about 150 g/m², greater than or equal to about 200 g/m², greater than or equal to about 250 g/m², greater than or equal to about 300 g/m², greater than or equal to about 350 g/m², greater than or equal to about 400 g/m², greater than or equal to about 500 g/m², greater than or equal to about 600 g/m², greater than or equal to about 700 g/m², greater than or equal to about 800 g/m², or greater than or equal to about 900 g/m²). In some cases, the basis weight of the first layer is less than or equal to about 1000 g/m² (e.g., less than or equal to about 1000 g/m², less than or equal to about 900 g/m², less than or equal to about 800 g/m², less than or equal to about 700 g/m², less than or equal to about 600 g/m², less than or equal to about 500 g/m², less than or equal to about 400 g/m², less than or equal to about 350 g/m², less than or equal to about 300 g/m², less than or equal to about 250 g/m², less than or equal to about 200 g/m², less than or equal to about 165 g/m², less than or equal to about 150 g/m², less than or equal to about 100 g/m², less than or equal to about 75 g/m², less than or equal to about 50 g/m²). Combinations of the above-referenced ranges are also possible (e.g., a first layer having a basis weight of greater than about 40 g/m² and less than or equal to about 350 g/m²). Other ranges are also possible.

The second layer may have a basis weight that ranges between about 3 and about 1000 g/m². For instance, the basis weight of the second layer may be greater than or equal to about 3 g/m² (e.g., greater than or equal to about 8 g/m², greater than or equal to about 10 g/m², greater than or equal to about 15 g/m², greater than or equal to about 20 g/m², greater than or equal to about 30 g/m², greater than or equal to about 40 g/m², greater than or equal to about 45 g/m², greater than or equal to about 50 g/m², greater than or equal to about 75 g/m², greater than or equal to about 100 g/m², greater than or equal to about 150 g/m², greater than or equal to about 200 g/m², greater than or equal to about 250 g/m², greater than or equal to about 300 g/m², greater than or equal to about 350 g/m², greater than or equal to about 400 g/m², greater than or equal to about 500 g/m², greater than or equal to about 600 g/m², greater than or equal to about 700 g/m², greater than or equal to about 800 g/m², or greater than or equal to about 900 g/m²). In some cases, the basis weight of the second layer is less than or equal to about 1000 g/m², less than or equal to about 900 g/m², less than or equal to about 800 g/m², less than or equal to about 700 g/m², less than or equal to about 600 g/m², less than or equal to about 500 g/m², less than or equal to about 400 g/m², less than or equal to about 350 g/m², less than or equal to about 300 g/m², less than or equal to about 250 g/m², less than or equal to about 200 g/m², less than or equal to about 165 g/m², less than or equal to about 150 g/m², less than or equal to about 100 g/m², less than or equal to about 75 g/m² (e.g., less than or equal to about 50 g/m², less than or equal to about 45 g/m², less than or equal to about 40 g/m², less than or equal to about 35 g/m², less than or equal to about 30 g/m², less than or equal to about 25 g/m², less than or equal to about 20 g/m², less than or equal to about 15 g/m², less than or equal to about 10 g/m², or less than or equal to about 5 g/m²). Combinations of the above-referenced ranges are also possible (e.g., a second layer having a basis weight of greater than about 3 g/m² and less than or equal to about 50 g/m²). Other ranges are also possible.

In some embodiments, the basis weights of the first and second layers may be chosen to achieve a particular basis weight ratio. For example, the basis weight ratio between the first and second layers (e.g., basis weight of first layer: basis weight of second layer) may be at least 1:1, at least 2:1, at least 3:1, at least 5:1, at least 6:1, at least 10:1, at least 15:1, or at least 20:1. In some embodiments, the basis weight ratio between the first and second layers is less than 20:1, less than 15:1, less than 14:1, less than 10:1, less than 6:1, less than 5:1, less than 4:1, less than 3:1, less than 2:1. Combinations of the above-referenced ranges are also possible (e.g., a basis weight ratio of at least 3:1 and less than 5:1). Other ranges are also possible.

In other embodiments, the basis weight ratio between the second and first layers (e.g., basis weight of second layer: basis weight of first layer) may be at least 1:1, at least 2:1, at least 3:1, at least 5:1, at least 6:1, at least 10:1, at least 15:1, or at least 20:1. In some embodiments, the basis weight ratio between the first and second layers is less than 20:1, less than 15:1, less than 14:1, less than 10:1, less than 6:1, less than 5:1, less than 4:1, less than 3:1, less than 2:1. Combinations of the above-referenced ranges are also possible (e.g., a basis weight ratio of at least 3:1 and less than 5:1).

In embodiments in which an additional layer (e.g., a third layer, a fourth layer, etc.) is included in a fiber web, the additional layer may have a basis weight that ranges between about 5 and about 800 g/m². For instance, the basis weight of the additional layer may be greater than or equal to about 5 g/m² (e.g., greater than or equal to about 10 g/m², greater than or equal to about 40 g/m², greater than or equal to about 65 g/m², greater than or equal to about 75 g/m², greater than or equal to about 100 g/m², greater than or equal to about 150 g/m², greater than or equal to about 200 g/m², greater than or equal to about 250 g/m², greater than or equal to about 300 g/m², greater than or equal to about 400 g/m², greater than or equal to about 500 g/m², greater than or equal to about 600 g/m², greater than or equal to about 700 g/m²). In some cases, the basis weight of the additional layer is less than or equal to about 800 g/m² (e.g., less than or equal to about 700 g/m², less than or equal to about 600 g/m², less than or equal to about 500 g/m², less than or equal to about 400 g/m², less than or equal to about 300 g/m², less than or equal to about 250 g/m², less than or equal to about 200 g/m², less than or equal to about 165 g/m², less than or equal to about 150 g/m², less than or equal to about 100 g/m², less than or equal to about 75 g/m², less than or equal to about 50 g/m²). Combinations of the above-referenced ranges are also possible (e.g., an additional layer having a basis weight of greater than about 5 g/m² and less than or equal to about 100 g/m²). Other ranges are also possible.

In certain embodiments, the fiber webs described herein may have a relatively high surface area. In certain embodiments, a fiber web may have a surface area between about 0.1 m²/g and about 100 m²/g. In some cases, a fiber web has a surface area of about 0.1 m²/g or greater, about 1 m²/g or greater, about 1.5 m²/g or greater, about 2.0 m²/g or greater, about 2.5 m²/g or greater, about 3 m²/g or greater, about 5 m²/g or greater, about 10 m²/g or greater, about 20 m²/g or greater, about 30 m²/g or greater, about 40 m²/g or greater, about 50 m²/g or greater, about 60 m²/g or greater, about 70 m²/g or greater, about 80 m²/g or greater, or about 90 m²/g or greater. In some embodiments, a fiber web has a surface area of about 100 m²/g or less, about 90 m²/g or less, about 80 m²/g or less, about 70 m²/g or less, about 60 m²/g or less, about 50 m²/g or less, about 40 m²/g or less, about 30 m²/g or less, about 20 m²/g or less, about 10 m²/g or less, about 5 m²/g or less, or about 2 m²/g or less. Combinations of the above-referenced ranges are also possible (e.g., a surface area of between about 100 m²/g or less and about 10 m²/g or greater). Other ranges are also possible.

In some embodiments, a layer (e.g., a first layer and/or a second layer) may have a surface area within one or more of the ranges described above.

As determined herein, surface area is measured through use of a standard BET surface area measurement technique. The BET surface area is measured according to section 10 of Battery Council International Standard BCIS-03A, "Recommended Battery Materials Specifications Valve Regulated Recombinant Batteries", section 10 being "Standard Test Method for Surface Area of Recombinant Battery Separator Mat". Following this technique, the BET surface area is measured via adsorption analysis using a BET surface analyzer (e.g., Micromeritics Gemini III 2375 Surface Area Analyzer) with nitrogen gas; the sample amount is between 0.5 and 0.6 grams in a ¾" tube; and, the sample is allowed to degas at 75 degrees C. for a minimum of 3 hours.

Thickness, as referred to herein, is determined according to the Standard TAPPI T411. The thickness of the fiber web may be between about 0.3 mm and about 10 mm. In some embodiments, the thickness of the fiber web may be greater than or equal to about 0.3 mm, greater than or equal to about 0.5 mm, greater than or equal to about 0.6 mm, greater than or equal to about 0.8 mm, greater than or equal to about 1.0 mm, greater than or equal to about 1.2 mm, greater than or equal to about 1.5 mm, greater than or equal to about 2 mm, greater than or equal to about 3 mm, greater than or equal to about 4 mm, greater than or equal to about 5 mm, or greater than or equal to about 7 mm. In certain embodiments, the thickness of the fiber web may be less than or equal to about 10 mm, less than or equal to about 7 mm, less than or equal to about 5 mm, less than or equal to about 4 mm, less than or equal to about 2 mm, less than or equal to about 1.2 mm, less than or equal to about 1.0 mm, less than or equal to about 0.8 mm, less than or equal to about 0.6 mm, or less than or equal to about 0.4 mm, less than or equal to about 0.2 mm. Combinations of the above-referenced ranges are also possible (e.g., a thickness of greater than about 0.3 mm and less than or equal to about 1.0 mm). Other ranges are also possible.

In some embodiments, a layer (e.g., a first layer and/or a second layer) may have a thickness within one or more of the ranges described above for the entire fiber web.

The fiber web may exhibit a suitable mean flow pore size. Mean flow pore size, as determined herein, is measured according to Standard ASTM F316. In some embodiments, the mean flow pore size may range between about 0.1 microns and about 50 microns (e.g., between about 0.1 microns and about 5 microns, between about 5 microns and about 40 microns, between about 15 microns and about 40 microns, or between about 25 microns and about 40 microns). In some embodiments, the mean flow pore size of the fiber web may be less than or equal to about 50 microns, less than or equal to about 45 microns, less than or equal to about 40 microns, less than or equal to about 30 microns, less than or equal to about 25 microns, less than or equal to about 20 microns, less than or equal to about 15 microns, less than or equal to about 10 microns, or less than or equal to about 5 microns, less than or equal to about 3 microns, less than or equal to about 2 microns, less than or equal to about 1 micron, less than or equal to about 0.8 microns, less than or equal to about 0.5 microns, or less than or equal to about 0.2 microns. In other embodiments, the mean flow pore size may be greater than or equal to about 0.1 microns, greater than or equal to about 0.2 microns, greater than or equal to about 0.5 microns, greater than or equal to about 0.8 microns, greater than or equal to about 1 micron, greater than or equal to about 2 microns, greater than or equal to about 5 microns, greater than or equal to about 10 microns, greater than or equal to about 15 microns, greater than or equal to about 20 microns, greater than or equal to about 25 microns, greater than or equal to about 30 microns, greater than or equal to about 35 microns, greater than or equal to about 45 microns or greater than or equal to about 50 microns. Combinations of the above-referenced ranges are also possible (e.g., a mean flow pore size of greater than or equal to about 10 microns and less than or equal to about 50 microns). Other values and ranges of mean flow pore size are also possible.

In some embodiments, it may be preferable for the fiber web to exhibit certain mechanical properties. For example, as described above, a fiber web comprised primarily of fibrillated synthetic fibers and non-fibrillated synthetic fibers (e.g., a fiber web having limited amounts of, or no, glass fiber) may give rise to a relatively flexible and strong filter media that does not include with it the environmental issues associated with conventional glass fibers in the filter media. In some embodiments, fiber webs described herein that have little to no glass fibers may exhibit a greater degree of elongation, burst strength and/or tensile strength relative to fiber webs having comparatively more glass fibers incorporated therein.

In some embodiments, the tensile elongation in the machine direction of the fiber web may be greater than about 0.2%, greater than about 0.5%, greater than about 0.8%, greater than about 2%, greater than about 5%, greater than about 8%, greater than about 10%, and/or less than or equal to about 12%. For example, the tensile elongation in the machine direction of the fiber web may be between about 0.2% and about 4.0%, between about 0.2% and about 3.0%, between about 0.5% and about 3.5%, between about 0.5% and about 2.0%, between about 1.0% and about 3.0%, between about 1.5% and about 2.5%, or between about 0.2% and about 12%. In some embodiments, the tensile elongation in the cross-machine direction of the fiber web may be greater than about 0.2%, greater than about 0.5%, greater than about 0.8%, or greater than about 1.0%, greater than about 2%, greater than about 5%, greater than about 8%, greater than about 10%, and/or less than or equal to about 12%. For example, the tensile elongation in the cross-machine direction of the fiber web may be between about 0.2% and about 6.0%, between about 0.2% and about 5.0%, between about 0.2% and about 4.0%, between about 0.5% and about 4.5%, between about 1.0% and about 3.5%, between about 1.0% and about 3.0%, between about 2.0% and about 3.5%, or between about 0.2% and about 12%. In some cases, fiber webs that exhibit an increased degree of elongation may also be more pleatable, for example, by exhibiting an overall reduction in potential damage that may arise at the edges of the filter media.

The tensile strength in the machine direction of the filter media may be greater than about 2 N/15 mm, greater than about 4 N/15 mm, greater than about 6 N/15 mm, greater than about 10 N/15 mm, greater than about 20 N/15 mm, greater than about 50 N/15 mm, greater than about 75 N/15 mm, greater than about 100 N/15 mm, greater than about 125 N/15 mm, greater than about 150 N/15 mm, or greater than about 175 N/15 mm, and/or less than or equal to about 200 N/15 mm. For example, the tensile strength in the machine direction of the fiber web may be between about 3 N/15 mm and about 20 N/15 mm, between about 1 N/15 mm and about 6 N/15 mm, between about 10 N/15 mm and about 20 N/15 mm, between about 1 N/15 mm and about 200 N/15 mm, or between about 100 N/15 mm and about 200 N/15 mm. The tensile strength of the fiber web in the cross-machine direction may be greater than about 1 N/15 mm, greater than about 3 N/15 mm, greater than about 4 N/15 mm, greater than about 6 N/15 mm, greater than about 10 N/15 mm, greater than about 20 N/15 mm, greater than about 50 N/15 mm, greater than about 75 N/15 mm, greater than about 100 N/15 mm, greater than about 125 N/15 mm, greater than about 150 N/15 mm, or greater than about 175 N/15 mm, and/or less than or equal to about 200 N/15 mm. In some cases, the tensile strength of the fiber web in the cross-machine direction may be between about 1 N/15 mm and about 6 N/15 mm, between about 2 N/15 mm and about 10 N/15 mm, or between about 3 N/15 mm and about 9 N/15 mm, between about 1 N/15 mm and about 200 N/15 mm, or between about 100 N/15 mm and about 200 N/15 mm. In some cases, the cross machine direction tensile strength may be greater or less than the machine direction tensile strength.

Tensile strength and tensile elongation are measured according to the Standard TAPPI T494.

Mullen burst tests may be used as a further test for strength in measuring the pressure required for puncturing the fiber web as an indicator of the load carrying capacity of the fiber web under certain conditions. Mullen burst strength is measured according to the Standard TAPPI T403. In some embodiments, the Mullen burst strength for the fiber web may be greater than 10 psi, greater than 15 psi, greater than 30 psi, greater than 40 psi, greater than 60 psi, greater than 75 psi, or between about 5 psi and about 120 psi, between about 5 psi and about 50 psi, or between about 30 psi and about 100 psi.

The fiber web described herein may also exhibit advantageous filtration performance characteristics, such as dust holding capacity (DHC), efficiency, air permeability, amongst others.

The fiber webs described herein can have beneficial dust holding properties. In some embodiments, the fiber web may have a DHC of between about 80 g/m² and about 300 g/m². In some embodiments, the DHC may be greater than or equal to about 80 g/m², greater than or equal to about 100 g/m², greater than or equal to about 125 g/m², greater than or equal to about 150 g/m², greater than or equal to about 175 g/m², greater than or equal to about 200 g/m², greater than or equal to about 225 g/m², greater than or equal to about 250 g/m², greater than or equal to about 275 g/m², greater than or equal to about 300 g/m², or greater than or equal to about 350 g/m². In some cases, the DHC may be less than or equal to about 400 g/m², less than or equal to about 350 g/m², less than or equal to about 300 g/m², less than or equal to about 275 g/m², less than or equal to about 250 g/m², less than or equal to about 225 g/m², less than or equal to about 200 g/m², less than or equal to about 175 g/m², less than or equal to about 150 g/m², less than or equal to about 125 g/m², or less than or equal to about 100 g/m². Combinations of the above-referenced ranges are also possible (e.g., a DHC of greater than about 150 g/m² and less than or equal to about 300 g/m²). Other ranges are also possible.

The dust holding capacity, as referred to herein, is tested based on a Multipass Filter Test following the ISO 16889/19438 procedure (modified by testing a flat sheet sample) on a Multipass Filter Test Stand manufactured by FTI. The test may be run under different conditions. The testing uses ISO A3 Medium test dust manufactured by PTI, Inc. at a base upstream gravimetric dust level (BUGL) of 10 to 50 mg/liter. The test fluid is Aviation Hydraulic Fluid AERO HFA MIL H-5606A manufactured by Mobil. The test is run at a face velocity of 0.06 to 0.16 cm/s until a terminal pressure of 1 to 2 (100 to 200 kPa). Unless otherwise stated, the dust holding capacity values (and/or efficiency values) described herein are determined at a BUGL of 25 mg/L, a face velocity of 0.06 cm/s, and a terminal pressure of 100 kPa.

The efficiency (e.g., liquid filtration efficiency) and initial efficiency (e.g., initial liquid filtration efficiency) of filtering various particle sizes can be measured using the Multipass Filter Test described above. Suitable fiber webs may be used for the filtration of particles having a size, for example, of greater than or equal to about 50 microns, greater than or equal to about 30 microns, greater than or equal to about 20 microns, greater than or equal to about 15 microns, greater than or equal to about 10 microns, greater than or equal to about 5 microns, greater than or equal to about 4 microns, greater than or equal to about 3 microns, or greater than or equal to about 1 micron. Particle counts (particles per milliliter) at the minimum particle size, x, selected (e.g., where x is 1, 2, 3, 4, 5, 7, 10, 15, 20, 25, 30, 40 or 50 microns) upstream and downstream of the media can be taken at ten points equally divided over the time of the test. Generally, a particle size of x means that x micron or greater particles will be captured by the layer or media. The average of upstream and downstream particle counts can be taken at each selected minimum particle size and particles greater than that size. From the average particle count upstream (injected, $C_0$) and the average particle count downstream (passed thru, C), the liquid filtration efficiency test value for each minimum particle size selected can be determined by the relationship $[(1-[C/C_0])*100\%]$. As described herein, efficiency can be measured according to standard ISO 16889/19438 procedure. A similar protocol can be used for measuring initial efficiency, which refers to the average efficiency measurements of the media at 4, 5, and 6 minutes after running the test. Unless otherwise indicated, efficiency and initial efficiency measurements described herein refer to values where x=4 microns.

The fiber webs described herein may have a wide range of efficiencies (e.g., liquid filtration efficiencies). In some embodiments, a fiber web has an efficiency of between about 90% and about 100%. The efficiency may be, for example, greater than or equal to about 90%, greater than or equal to about 92%, greater than or equal to about 94%, greater than or equal to about 96%, greater than or equal to about 98%, greater than or equal to about 99%, greater than or equal to about 99.4%, greater than or equal to about 99.5%, greater than or equal to about 99.7%, greater than or equal to about 99.8%, greater than or equal to about 99.9%, or greater than or equal to about 99.99%. Such efficiencies may be achieved for filtering particles of different sizes such as particles of 10 microns or greater, particles of 8 microns or greater, particles of 6 microns or greater, particles of 5 microns or greater, particles of 4 microns or greater, particles of 3 microns or greater, particles of 2 microns or greater, or particles of 1 micron or greater. Other particle sizes and efficiencies are also possible.

Efficiency values described above are applicable for single layer arrangements as well as for arrangements that include multilayers. For example, the combined filtration arrangement including a first layer and a second layer, wherein one of the layers includes at least one fibrillated fiber, may exhibit an efficiency of greater than or equal to about 90%, greater than or equal to about 92%, greater than or equal to about 94%, greater than or equal to about 96%, greater than or equal to about 98%, greater than or equal to about 99%, greater than or equal to about 99.4%, greater than or equal to about 99.5%, greater than or equal to about 99.7%, greater than or equal to about 99.8%, greater than or equal to about 99.9%, or greater than or equal to about 99.99% for particles of 4 microns or greater in some embodiments, particles of 3 microns or greater in other embodiments, particles of 2 microns or greater in yet other embodiments, or particles of 1 micron or greater in further embodiments.

In some embodiments, a layer (e.g., a first layer, a second layer, and/or an additional layer) may have an efficiency within one or more of the ranges described above.

Additionally, a fiber web may have a suitable initial efficiency. In some embodiments, the initial efficiency may range from about 30% to about 99.999% (e.g., between about 60% to about 99.9%). For instance, in certain embodiments, the initial efficiency may be at least about 30%, at least about 40%, at least about 50%, at least about 60%, at least about 70%, at least about 80%, at least about 90%, at least about 95%, at least about 98%, at least about 99%, at least about 99.9%. Other ranges are also possible.

In some embodiments, a layer (e.g., a first layer, a second layer and/or an additional layer) may have an initial efficiency within one or more of the ranges described above.

In certain embodiments, a fiber web may be configured to achieve a high fuel-water separation efficiency, e.g., for separating out water from a fuel-water emulsion. In some embodiments, the fuel-water separation efficiency may range from about 30% to about 99.999% (e.g., between about 60% to about 99.9%). For instance, in certain embodiments, the fuel-water separation efficiency may be at least about 30%, at least about 40%, at least about 50%, at least about 60%, at least about 70%, at least about 80%, at least about 90%, at least about 95%, at least about 98%, at least about 99%, at least about 99.9%. Other ranges are also possible.

As used herein, a fuel-water separation efficiency is measured using the SAEJ1488 test. The test involves sending a fuel (ultra-low sulfur diesel fuel) with a controlled water content (2500 ppm) through a pump across the media at a face velocity of 0.069 cm/sec. The water is emulsified into fine droplets and sent to challenge the media. The water is either coalesced, or shed or both, and collects at the bottom of the housing. The water content is measured both upstream and downstream of the media, via Karl Fischer titration. The efficiency is the amount of water removed from the fuel-water mixture. The fuel-water separation efficiency is calculated as $(1-C/2500)*100$, where C is the downstream concentration of water.

Generally, the media can be classified as coalescing or shedding based on the amount of water collected. If the water collection is more upstream, then the media is primarily shedding. If the water collecting is more downstream, then the media is primarily coalescing. Combinations can also occur where the media can be both coalescing and shedding.

The fiber webs may exhibit suitable air permeability characteristics. In some embodiments, the air permeability may range from between about 0.1 cubic feet per minute per square foot (cfm/sf) and about 250 cfm/sf (e.g., between about 0.5 cfm/sf and about 50 cfm/sf, between about 50 cfm/sf and about 125 cfm/sf, between about 5 cfm/sf and about 150 cfm/sf, between about 10 cfm/sf and about 150 cfm/sf, or between about 50 cfm/sf and about 150 cfm/sf). In some embodiments, the air permeability may be greater than or equal to about 0.5 cfm/sf, greater than or equal to about 2 cfm/sf, greater than or equal to about 5 cfm/sf, greater than or equal to about 10 cfm/sf, greater than or equal to about 25 cfm/sf, greater than or equal to about 50 cfm/sf, greater than or equal to about 75 cfm/sf, greater than or equal to about 100 cfm/sf, greater than or equal to about 150 cfm/sf, greater than or equal to about 200 cfm/sf, or greater than or equal to about 250 cfm/sf. In certain embodiments, the air permeability may be less than or equal to about 250 cfm/sf, less than or equal to about 200 cfm/sf, less than or equal to about 175 cfm/sf, less than or equal to about 150 cfm/sf, less than or equal to about 125 cfm/sf, less than or equal to about 100 cfm/sf, less than or equal to about 75 cfm/sf, less than or equal to about 50 cfm/sf, less than or equal to about 25 cfm/sf, or less than or equal to about 5 cfm/sf. Combinations of the above-referenced ranges are also possible (e.g., an air permeability of greater than or equal to 5 cfm/sf and less than or equal to about 200 cfm/sf). Other ranges are also possible.

As determined herein, the permeability is measured according to the Standard TAPPI T-251. The permeability is an inverse function of flow resistance and can be measured with a Frazier Permeability Tester (e.g., TexTest Instrument, FX 3300). The Frazier Permeability Tester measures the volume of air per unit of time that passes through a unit area of sample at a fixed differential pressure across the sample. Permeability can be expressed in cubic feet per minute per square foot at a 0.5 inch water differential.

In some embodiments, a layer (e.g., a first layer and/or a second layer) may have a permeability within one or more of the ranges described above.

In some embodiments, an additional layer (e.g., a third layer, a fourth layer, etc.) of the fiber web may have an air permeability between about 0.5 cubic feet per minute per square foot (cfm/sf) and about 1500 cfm/sf (e.g., between about 0.5 cfm/sf and about 70 cfm/sf, between about 5 cfm/sf and about 700 cfm/sf, or between about 5 cfm/sf and about 1300 cfm/sf). In some embodiments, the air permeability may be greater than or equal to about 0.5 cfm/sf, greater than or equal to about 5 cfm/sf, greater than or equal to about 10 cfm/sf, greater than or equal to about 50 cfm/sf, greater than or equal to about 70 cfm/sf, greater than or equal to about 100 cfm/sf, greater than or equal to about 300 cfm/sf, greater than or equal to about 500 cfm/sf, greater than or equal to about 700 cfm/sf, or greater than or equal to about 1000 cfm/sf. In certain embodiments, the air permeability may be less than or equal to about 1500 cfm/sf, less than or equal to about 1300 cfm/sf, less than or equal to about 1000 cfm/sf, less than or equal to about 800 cfm/sf, less than or equal to about 400 cfm/sf, less than or equal to about 100 cfm/sf, or less than or equal to about 50 cfm/sf. Combinations of the above-referenced ranges are also possible. Other ranges are also possible.

In some embodiments, the fiber webs described herein may have a certain relationship between mean flow pore size to permeability. The relationship between mean flow pore size and permeability may be expressed as [mean flow pore $(\mu m)/(\text{permeability (cfm/sf)})^{0.5}$], also referred to herein as the Perm. Pore Index. In other words, the mean flow pore size of the fiber media may be divided by the square root of the permeability of the media. Generally, a fiber web having a higher efficiency may have a lower [mean flow pore $(\mu m)/(\text{permeability (cfm/sf)})^{0.5}$] value if all other factors are equal.

In some embodiments, the fiber webs described herein have a [mean flow pore $(\mu m)/(\text{permeability (cfm/sf)})^{0.5}$] value of between about 0.5 and about 3.0. In some embodiments, a fiber web has a [mean flow pore $(\mu m)/(\text{permeability (cfm/sf)})^{0.5}$] value of less than or equal to about 3, less than or equal to about 2.5, less than or equal to about 2, less than or equal to about 1.8, less than or equal to about 1.6, less than or equal to about 1.5, less than or equal to about 1.4, less than or equal to about 1.2, less than or equal to about 1.0, less than or equal to about 0.9, less than or equal to about 0.8, less than or equal to about 0.7, or less than or equal to about 0.6. In some embodiments, a fiber web has a [mean flow pore $(\mu m)/(\text{permeability (cfm/sf)})^{0.5}$] value of greater than or equal to about 0.5, greater than or equal to about 0.6, greater than or equal to about 0.8, greater than or equal to about 1.0, greater than or equal to about 1.2, greater than or equal to about 1.5, or greater than or equal to about 2.0. Combinations of the above-referenced ranges are also possible (e.g., a [mean flow pore $(\mu m)/(\text{permeability (cfm/sf)})^{0.5}$] value of greater than about 0.5 and less than or equal to about 1.5). Other values are also possible.

In some embodiments, a layer (e.g., a first layer and/or a second layer) may have a [mean flow pore $(\mu m)/(\text{permeability (cfm/sf)})^{0.5}$] value within one or more of the ranges described above.

It should be appreciated that although the parameters and characteristics noted above are described with respect to fiber webs, the same parameters and characteristics (including the values and ranges for such parameters and characteristics) may also be applied to filter media.

Fiber webs described herein may be produced using suitable processes, such as using a wet laid process or a non-wet laid process (e.g., a dry laid process, a spinning process, a meltblown process, or any other suitable process). In general, a wet laid process involves mixing together of fibers of one or more type; for example, non-fibrillated fibers (e.g., mono-component and/or bi-component fibers) may be mixed together with fibrillated fibers, or any other components (e.g., other types of synthetic fibers), to provide a fiber slurry. In certain embodiments, only fibrillated fibers are included in a slurry. In some embodiments, the fibrillated fibers are of one type but have different levels of fibrillation. The slurry may be, for example, an aqueous-based slurry. In certain embodiments, fibrillated fibers, optional non-fibrillated fibers, and any other appropriate fibers, are optionally stored separately, or in combination, in various holding tanks prior to being mixed together (e.g., to achieve a greater degree of uniformity in the mixture).

For instance, a first fiber (e.g., fibrillated fibers or non-fibrillated fibers) may be mixed and pulped together in one container and a second fiber (e.g., fibrillated fibers) may be mixed and pulped in a separate container. The first fibers and the second fibers may subsequently be combined together into a single fibrous mixture. Appropriate fibers may be processed through a pulper before and/or after being mixed together. In some embodiments, combinations of fibers such as non-fibrillated fibers, fibrillated fibers and/or other synthetic fibers, are processed through a pulper and/or a holding tank prior to being mixed together. It can be appreciated that other components may also be introduced into the mixture. Furthermore, it should be appreciated that other combinations of fibers types may be used in fiber mixtures, such as the fiber types described herein.

In certain embodiments, two or more layers are formed by a wet laid process. For example, a first dispersion (e.g., a pulp) containing fibers in a solvent (e.g., an aqueous solvent such as water) can be applied onto a wire conveyor in a papermaking machine (e.g., a fourdrinier or a rotoformer) to form first layer supported by the wire conveyor. A second dispersion (e.g., another pulp) containing fibers in a solvent (e.g., an aqueous solvent such as water) is applied onto the first layer either at the same time or subsequent to deposition of the first layer on the wire. Vacuum is continuously applied to the first and second dispersions of fibers during the above process to remove the solvent from the fibers, thereby resulting in an article containing first and second layers. The article thus formed is then dried and, if necessary, further processed (e.g., calendered) by using known methods to form multi-layered fiber webs. In some embodiments, such a process may result in a gradient in at least one property across the thickness of the two or more layers.

Any suitable method for creating a fiber slurry may be used. In some embodiments, further additives are added to the slurry to facilitate processing. The temperature may also be adjusted to a suitable range, for example, between 33° F. and 100° F. (e.g., between 50° F. and 85° F.). In some cases, the temperature of the slurry is maintained. In some instances, the temperature is not actively adjusted.

In some embodiments, the wet laid process uses similar equipment as in a conventional papermaking process, for example, a hydropulper, a former or a headbox, a dryer, and an optional converter. A fiber web can also be made with a laboratory handsheet mold in some instances. As discussed above, the slurry may be prepared in one or more pulpers. After appropriately mixing the slurry in a pulper, the slurry may be pumped into a headbox where the slurry may or may not be combined with other slurries. Other additives may or may not be added. The slurry may also be diluted with additional water such that the final concentration of fiber is in a suitable range, such as for example, between about 0.1% to 0.5% by weight.

Wet laid processes may be particularly suitable for forming gradients of one or more properties in a fiber web, such as those described herein. For instance, in some cases, the same slurry is pumped into separate headboxes to form different layers and/or a gradient in a fiber web. In other cases, two or more different slurries may be pumped into separate headboxes to form different layers and/or a gradient in a fiber web. For laboratory samples, a first layer can be formed from a fiber slurry, drained and dried and then a second layer can be formed on top from a fiber slurry. In other embodiments, a first layer can be formed and a second layer can be formed on top, drained and dried.

In some cases, the pH of the fiber slurry may be adjusted as desired. For instance, fibers of the slurry may be dispersed under generally neutral conditions.

Before the slurry is sent to a headbox, the slurry may optionally be passed through centrifugal cleaners and/or pressure screens for removing unfiberized material. The slurry may or may not be passed through additional equipment such as refiners or deflakers to further enhance the dispersion or fibrillation of the fibers. For example, deflakers may be useful to smooth out or remove lumps or protrusions that may arise at any point during formation of the fiber slurry. Fibers may then be collected on to a screen or wire at an appropriate rate using any suitable equipment, e.g., a fourdrinier, a rotoformer, a cylinder, or an inclined wire fourdrinier.

In some embodiments, the process involves introducing binder (and/or other components) into a pre-formed fiber layer (e.g., including a fibrillated fiber with a non-fibrillated fiber). In some embodiments, as the fiber layer is passed along an appropriate screen or wire, different components included in the binder, which may be in the form of separate emulsions, are added to the fiber layer using a suitable technique. In some cases, each component of the binder resin is mixed as an emulsion prior to being combined with the other components and/or fiber layer. In some embodiments, the components included in the binder may be pulled through the fiber layer using, for example, gravity and/or vacuum. In some embodiments, one or more of the components included in the binder resin may be diluted with softened water and pumped into the fiber layer. In some embodiments, a binder may be introduced to the fiber layer by spraying onto the formed media, or by any other suitable method, such as for example, size press application, foam saturation, curtain coating, rod coating, amongst others. In some embodiments, a binder material may be applied to a fiber slurry prior to introducing the slurry into a headbox. For example, the binder material may be introduced (e.g., injected) into the fiber slurry and impregnated with and/or precipitated on to the fibers. In some embodiments, a binder resin may be added to a fiber web by a solvent saturation process, as described in more detail herein.

In other embodiments, a non-wet laid process is used to form one or more layers of a fiber web. In certain embodiments, a non-wet laid process involves a dry laid process, such as a carding process. In some embodiments, an air laid process is used. For example, in an air laid process, non-fibrillated synthetic fibers may be mixed along with fibrillated fibers (e.g., lyocell) while air is blown onto a conveyor, and a binder is then applied. In a carding process, in some embodiments, the fibers are manipulated by rollers and extensions (e.g., hooks, needles) associated with the rollers prior to application of the binder. In some cases, forming the fiber webs through a non-wet laid process may be more suitable for the production of a highly porous media.

As described herein, a first and/or second layer of a fiber web may be formed by a non-wet laid process. In some embodiments, the first and/or second layer may be impregnated (e.g., via saturation, spraying, etc.) with any suitable binder resin, as discussed above.

During or after formation of a fiber web, the fiber web may be further processed according to a variety of known techniques. Optionally, additional layers can be formed and/or added to a fiber web using processes such as lamination, co-pleating, or collation. For example, in some cases, two layers are formed into a composite article by a wet laid process as described above, and the composite article is then combined with a third layer by any suitable process (e.g., lamination, co-pleating, or collation). It can be appreciated that a fiber web or a composite article formed by the processes described herein may be suitably tailored not only based on the components of each fiber layer, but also according to the effect of using multiple fiber layers of varying properties in appropriate combination to form fiber webs having the characteristics described herein.

In some embodiments, further processing may involve pleating the fiber web. For instance, two layers may be joined by a co-pleating process. In some cases, the fiber web, or various layers thereof, may be suitably pleated by forming score lines at appropriately spaced distances apart from one another, allowing the fiber web to be folded. It should be appreciated that any suitable pleating technique may be used.

In some embodiments, a fiber web can be post-processed such as subjected to a corrugation process to increase surface area within the web. In embodiments in which a fiber web is pleated or corrugated, the depth of the pleats or corrugations may vary from about 0.01 mm to about 7 mm. For instance, the depth of the pleats or corrugations may be at least about 0.01 mm, at least about 0.1 mm, at least about 1 mm, at least about 2 mm, or at least about 5 mm, and/or less than or equal to about 7 mm, less than or equal to about 5 mm, less than or equal to about 3 mm, or less than or equal to about 1 mm. Combinations of the above-referenced ranges are possible. Other ranges are also possible. The periodicity of the pleats or corrugations may also vary, e.g., from about 2 cycles/inch to about 8 cycles per inch.

In other embodiments, a fiber web may be embossed or subject to a dimpling process to produce protrusions and/or indentations in the fiber web. In such embodiments, the depth of the protrusions or indentations may vary from about 0.01 mm to about 7 mm. For instance, the depth of the protrusions or indentations may be at least about 0.01 mm, at least about 0.1 mm, at least about 1 mm, at least about 2 mm, or at least about 5 mm, and/or less than or equal to about 7 mm, less than or equal to about 5 mm, less than or equal to about 3 mm, or less than or equal to about 1 mm. Combinations of the above-referenced ranges are possible. Other ranges are also possible.

It should be appreciated that the fiber web may include other parts in addition to the one or more layers described herein. In some embodiments, further processing includes incorporation of one or more structural features and/or stiffening elements. For instance, the fiber web may be combined with additional structural features such as polymeric and/or metallic meshes. In one embodiment, a screen backing may be disposed on the fiber web, providing for further stiffness. In some cases, a screen backing may aid in retaining the pleated configuration. For example, a screen backing may be an expanded metal wire or an extruded plastic mesh.

In some embodiments, fiber webs used as filter media can be incorporated into a variety of filter elements for use in various filtering applications. Exemplary types of filters include hydraulic mobile filters, hydraulic industrial filters, fuel filters (e.g., automotive fuel filters), oil filters (e.g., lube oil filters or heavy duty lube oil filters), chemical processing filters, industrial processing filters, medical filters (e.g., filters for blood), air filters, and water filters. In some cases, filter media described herein can be used as coalescer filter media. The filter media may be suitable for filtering gases or liquids.

The fiber webs and filter media disclosed herein can be incorporated into a variety of filter elements for use in various applications including hydraulic and non-hydraulic filtration applications including fuel applications, lube applications, air applications, amongst others. Exemplary uses of hydraulic filters (e.g., high-, medium-, and low-pressure filters) include mobile and industrial filters.

During use, the fiber webs mechanically trap particles on or in the layers as fluid flows through the filter media. The fiber webs need not be electrically charged to enhance trapping of contamination. Thus, in some embodiments, the filter media are not electrically charged. However, in some embodiments, the filter media may be electrically charged.

EXAMPLES

The following examples are intended to illustrate certain embodiments of the present invention, but are not to be construed as limiting and do not exemplify the full scope of the invention.

Example 1

This example demonstrates a method of fabricating dual layer fiber webs including a first layer comprising cellulose pulp fibers and a second layer comprising fibrillated aramid fibers.

Dual layer handsheets were made using a laboratory handsheet mold. The fibers for the first layer were mixed in a blender with 1000 mL of water for 2 minutes. The slurry was placed in a handsheet mold and the fiber web was formed on a wire. The fiber web was drained and dried. Then the fiber web was placed back into the handsheet mold, and the second slurry was placed into the handsheet mold and formed on top of the first layer. The resulting fiber web was drained and dried. The resulting fiber webs included a first layer comprising cellulose pulp and a second layer comprising fibrillated aramid fibers. The amount of material added for the first layer was 18.9 g (HP-11 softwood pulp, HBA softwood pulp, and Kuralon SPG-056 polyvinyl alcohol fiber in the ratio of [56.5:42.5:1]) and the amount of material (100% aramid pulp) added for the second layer was 3.8 g. The Canadian Standard Freeness for the fibrillated aramid fibers was an average of 80 mL.

The sample had a permeability of 2.5 CFM, a mean flow pore of 1.1 microns, an average Multipass efficiency of 99.7% at 4 micron or greater particles, a dust hold capacity of 115 g/m$^2$, and a basis weight of 137.5 lb/ream (with the second layer having a basis weight of 12.5 lb/ream and the first layer having a basis weight of 125 lb/ream). Multipass Filter Tests for determining efficiency and dust holding capacity were performed at 10 mg/L base upstream gravimetric level (BUGL), a face velocity of 0.16 cm/s, a 200 kPa terminal pressure and a flow rate of 1 L/min following the ISO 16889/19438 procedure. The Perm. Pore Index value was 0.696.

This example shows that relatively high efficiencies at 4 microns can be obtained in fiber media including fibrillated fibers in one layer. This example also shows that a relatively low Perm. Pore Index and a relatively high dust holding capacity can be obtained in such media. This example also shows that such efficiencies and dust holding capacities can be obtained in fiber webs that do not include any glass fibers.

Example 2

This example shows the fabrication of a wet laid fiber web including a first layer comprising a mixture of Robur Flash (cellulose) fibers: HP-11 softwood fibers: PET (0.6 d×5 mm) fibers, and a second layer comprising fibrillated lyocell fibers. Several samples were made varying the level of fibrillation of the fibers in the first layer.

A wet laid papermaking process was used to fabricate dual layer fiber webs. The first layer was formed on a Fourdrinier machine and drained, and the second layer was formed on top using another headbox. The resulting fiber webs included a first layer comprising a mixture of Robur Flash (cellulose) fibers: HP-11 softwood fibers: PET (0.6 d×5 mm) fibers, and a second layer comprising fibrillated lyocell fibers. The lyocell fibers in the second layer had an average Canadian Standard Freeness of 40 mL. The weight ratios of the fibers in the first layer were 1:1:0.46 by weight. The basis weight ratios of the second layer to first layer were varied, as were the conditions for refining (fibrillating) the fibers in the first layer. The target basis weight for the combined layers was 60 lb/ream for each sample. The following conditions were tested:

a. Sample 1: Second layer:first layer basis weight ratio of 1:2, with no fibrillation of fibers in the first layer.

b. Sample 2: Second layer:first layer basis weight ratio of 1:2 with some fibrillation of fibers in the first layer. The Perm. Pore Index value was 2.33.

c. Sample 3: Second layer:first layer basis weight ratio of 1:5, with some fibrillation of fibers in the first layer. The Perm. Pore Index value was 0.94. The above three conditions resulted in fiber webs having a relatively low [mean flow pore (µm)/(permeability (cfm/sf))$^{0.5}$] values ranging from 1-3.

This example also shows that desirable Perm. Pore Index values can be obtained in fiber webs that do not include any glass fibers.

Example 3

Fiber webs were made using a combination of lyocell and eucalyptus fibers as a first, top layer. The first layer was formed on a second, bottom layer that did not include fibrillated fibers. Eucalyptus is a hardwood pulp with very small diameter and can help in obtaining a tight top layer. The lyocell fibers in the first, top layer had an average CSF value of about 40 mL. The amounts of lyocell and eucalyptus fibers in the first layer were varied. The basis weight of the first layer was also varied.

The basis weight of the second, bottom layer was 55 lb/ream layer and was formed of Robur Flash (cellulose) fibers: HP-11 fibers: PET (0.6 d×5 mm) fibers in the ratio 1:1:0.46 by weight. Table 1 shows the fraction of lyocell and eucalyptus fibers in the first, top layer, the basis weight of the first, top layer, and the resulting Perm. Pore Index measured for each of the samples.

TABLE 1

| Sample | Fraction of Lyocell fibers in first layer | Fraction of *Eucalyptus* fibers in first layer | Basis weight of first, top layer (lb/ream) | Perm. Pore Index* |
|---|---|---|---|---|
| 1 | 0.5 | 0.5 | 20 | 1.02 |
| 2 | 0.5 | 0.5 | 20 | 1.01 |
| 3 | 0.5 | 0.5 | 10 | 1.00 |
| 4 | 1 | 0 | 10 | 0.69 |
| 5 | 0.5 | 0.5 | 20 | 1.00 |
| 6 | 0.5 | 0.5 | 10 | 0.93 |
| 7 | 0 | 1 | 10 | 1.91 |
| 8 | 1 | 0 | 20 | 0.83 |
| 9 | 0 | 1 | 20 | 2.23 |
| 10 | 0.5 | 0.5 | 10 | 1.02 |

*The Perm. Pore Index is measured as [mean flow pore (µm)/(permeability (cfm/sf))$^{0.5}$].

This example shows that relatively low Perm. Pore Index values can be obtained by adding lyocell in combination with another pulp in a first, top layer. The Perm. Pore Index values obtained for the samples were between 0.8 and 2.25. This example also shows that such values can be obtained in fiber webs that do not include any glass fibers.

Example 4

This experiment shows that fiber media having different air permeabilities can be achieved when varying the level of fibrillation of lyocell fibers in a first, top layer of a dual layer web.

The first, top layer included lyocell fibers and the basis weight of the layer was varied between 10 lb/ream and 20 lb/ream in different samples. The second, bottom layer was made from HPZ, softwood kraft pulp and eucalyptus fibers in the weight ratio of 0.34:0.15:0.52 and remained the same for all samples. The Canadian Standard Freeness (CSF) of the lyocell fibers in the top layer was varied and was 40 mL, 60 mL 200 mL, or 250 mL. The Perm. Pore Index values for each of the samples were measured as shown in Table 2.

The basis weight, air permeability, dust holding capacity, and efficiency at 4 microns was also tested for the fiber webs, as shown in Table 3. Multipass Filter Tests for determining efficiency and dust holding capacity were performed at 25 mg/L base upstream gravimetric level (BUGL), a face velocity of 0.06 cm/s, a 100 kPa terminal pressures and a flow rate of 1 L/min following the ISO 16889/19438 procedure.

TABLE 2

| Sample No. | CSF (mL) | Basis weight of top layer (lb/ream) | Thickness (mm) | Perm. Pore Index* |
|---|---|---|---|---|
| 1 | 200 | 10 | 0.64 | 1.46 |
| 2 | 200 | 20 | 0.68 | 1.42 |
| 3 | 250 | 10 | 0.63 | 1.57 |
| 4 | 250 | 20 | 0.71 | 1.55 |
| 5 | 60 | 10 | 0.61 | 1.19 |
| 6 | 60 | 20 | 0.65 | 1.21 |
| 7 | 40 | 10 | 0.62 | 0.96 |
| 8 | 40 | 20 | 0.68 | 0.81 |
| 9 | No Lyocell | 0 | 0.55 | 2.97 |

*The Perm. Pore Index is measured as [mean flow pore (µm)/(permeability (cfm/sf))$^{0.5}$].

TABLE 3

| Sample Nos. | Basis weight (lb/ream) | Air Perm (CFM) | Perm. Pore Index | Thickness at 20 KPa (mm) | Dust Holding Capacity (g/m²) | Efficiency at 4 µm (%) |
|---|---|---|---|---|---|---|
| 1 | 68.92 | 6.12 | 1.57 | 0.63 | 113.4 | 99.88 |
| 3 | 67.95 | 8.66 | 1.46 | 0.65 | 137.99 | 99.71 |

This example shows that different air permeabilities can be obtained when lyocell fibers having different levels of fibrillation are used in a first, top layer. The fiber webs have Perm. Pore Index values of less than 3. Furthermore, the fibers webs achieve high efficiency values. This example also shows that such values can be obtained in fiber webs that do not include any glass fibers.

Example 5

This example demonstrates a method of fabricating a dual layer fiber web including a first layer comprising cellulose pulp fibers and a second layer comprising fibrillated lyocell fibers, which was then collated with a meltblown layer positioned downstream of the second layer.

Dual layer handsheets were made using a laboratory handsheet mold. The fibers for the first layer (10.8 g of cellulose fibers including 15% Prince George Pulp, 51% Eucalyptus fiber, 33% porosanier fiber) were mixed in a blender with 1000 mL of water for 2 minutes to form a first slurry. The first slurry was placed in a handsheet mold and the fiber web (i.e., the first layer) was formed on a wire. The fiber web was drained and dried. The fiber web was then placed back into the handsheet mold to act as a substrate for the second layer.

The second slurry contained 7.57 g of fibrillated lyocell pulp with 21% solids in 1000 mL of water. The average Canadian Standard Freeness for the fibrillated lyocell fibers was 200 mL. The second slurry was placed into the handsheet mold to form a second layer on top of the first layer. The resulting dual layer fiber web was drained and dried. The resulting dual layer web had a basis weight of 107.4 gsm and an air permeability of 15.4 cfm/sf.

A layer of meltblown fibers on a scrim having a basis weight of 36.8 gsm and an air permeability of 10 cfm/sf was collated with the dual layer web to form an overall composite. The meltblown layer was positioned downstream of the second layer of dual layer web in the composite. The average fiber diameter of the meltblown fibers was 1 micron.

The composite had an air permeability of 6 cfm/sf, a dust holding capacity of 156 gsm, and a basis weight of 143.6 gsm. The initial efficiency of the composite was 99.47% at 4 micron or greater particles. The liquid filtration efficiency of the composite was 99.81% at 4 micron or greater particles. Multipass Filter Tests for determining initial efficiency, liquid filtration efficiency, and dust holding capacity were performed at 50 mg/L base upstream gravimetric level (BUGL), a face velocity of 0.06 cm/s, and a flow rate of 1 L/min following the ISO 16889/19438 procedure. The initial efficiency is the efficiency at 4, 5 and 6 minutes after running the test. The liquid filtration efficiency is the efficiency of the media after reaching a 100 kPa terminal pressure.

This example shows that relatively high dust holding capacities and efficiencies at 4 microns can be obtained in filter media including fibrillated fibers in one layer and meltblown fibers in another layer. Comparable dust holding capacities and efficiencies were achieved with the use of fibrillated fibers having lower freeness (e.g., CSF=200 mL) in this example, compared to media including fibrillated fibers having relatively higher freeness (e.g., average CSF values of 80 mL in Example 1, 40 mL in Example 2, and 40 mL in Example 3). This example also shows that such dust holding capacities and efficiencies can be obtained in fiber webs that do not include any glass fibers.

Example 6

This example shows that filter media including a meltblown layer can improve fuel-water separation efficiency of the media.

The procedure described in Example 5 was used to form a composite media. The composite media included a dual layer fiber web including a first layer comprising cellulose pulp fibers and a second layer comprising fibrillated lyocell fibers, which was then collated with a meltblown layer positioned downstream of the second layer.

The dual layer fiber web of this example had similar characteristics as the dual layer fiber web described in Example 5, except the fibrillated lyocell fibers had an average Canadian Standard Freeness of 100 mL.

The meltblown layer did not include a scrim, and had a basis weight of 106 gsm, an air permeability of 25.8 cfm/sf, and an average fiber diameter of 4-8 microns.

The composite including the dual layer fiber web and meltblown layer had an initial liquid filtration efficiency of 99.5%, a liquid filtration efficiency of 99.7%, and a fuel-water separation efficiency of 63.2%. Without the meltblown layer, the dual layer fiber web had a fuel-water separation efficiency of 32.5%.

It is expected that a fuel-water separation efficiency of higher than 63.2% would be achieved with the media described in Example 5, which included finer meltblown fibers (1 micron) compared to those of the meltblown layer in this example (4-8 microns).

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A filter media, comprising:
   a first layer comprising a plurality of organic polymer fibers;
   a second layer comprising a plurality of fibrillated fibers, wherein the second layer is a wet laid layer, the second layer has a lower air permeability than the first layer, and wherein the first and/or second layers comprises between 0 wt % to about 10 wt % of glass fibers; and
   a third layer comprising synthetic polymer fibers, wherein the third layer is a non-wet laid layer, wherein the filter media can achieve a fuel-water separation efficiency of between about 60 to about 99.9%.

2. The filter media of claim 1, wherein the first layer has a first basis weight of greater than or equal to about 40 g/m² and less than about 300 g/m².

3. The filter media of claim 1, wherein the second layer has a second basis weight of greater than or equal to about 3 g/m² and less than about 50g/m².

4. The filter media of claim 1, wherein a ratio of a basis weight of the first layer to a basis weight of the second layer is at least about 3:1 and less than about 5:1.

5. The filter media of claim 1, wherein the filter media comprises greater than about 5 wt % and less than or equal to about 60 wt % fibrillated fibers.

6. The filter media of claim 1, wherein the second layer comprising greater than or equal to about 60 wt % fibrillated fibers.

7. The filter media of claim 1, wherein the filter media comprises a gradient in the amount of a fibrillated fiber across the thickness of the filter media.

8. The filter media of claim 1, wherein the filter media has a liquid filtration efficiency of at least 99% for 4 microns or greater particles, wherein the efficiency is measured using a Multipass Filter Tests using a 25 mg/L base upstream gravimetric level (BUGL), a face velocity of 0.06 cm/s, and a 100 kPa terminal pressure following the ISO 16889/19438 procedure.

9. The filter media of claim 1, wherein the third layer comprises meltblown fibers, meltspun fibers, centrifugal spun fibers, or electrospun fibers.

10. The filter media of claim 1, wherein the second layer comprises a mixture of fibrillated fibers and non-fibrillated fibers.

11. The filter media of claim 1, wherein the third layer has a basis weight of greater than equal to about 5 g/m² and less than or equal to about 100 g/m².

12. The filter media of claim 1, wherein the third layer has air permeability of less than about 100 cfm/sf.

13. The filter media of claim 1, wherein the third layer is positioned upstream of the first and second layers.

14. The filter media of claim 1, wherein the third layer is positioned upstream of the second layer, and the second layer is positioned upstream of the first layer.

15. The filter media of claim 1, wherein the first layer comprises cellulose fibers.

16. The filter media of claim 1, wherein the first layer is a wet laid layer, wherein the first layer comprises fibrillated fibers, wherein the second layer is positioned upstream of the first layer, and wherein the third layer is positioned downstream of the first layer.

17. The filter media of claim 1, wherein the third layer is positioned upstream of the first and second layers, wherein the second layer comprises fibrillated fibers, and wherein the first layer is a wet laid layer.

18. The filter media of claim 1, wherein the first layer is a wet laid layer and comprises fibrillated fibers, and wherein the third layer comprises meltblown fibers, meltspun fibers, centrifugal spun fibers, or electrospun fibers and is positioned downstream of the first layer.

19. The filter media of claim 1, wherein the first and second layers are substantially free of glass fibers.

20. The filter media of claim 1, wherein the third layer comprises meltblown fibers, meltspun fibers, centrifugal spun fibers, or electrospun fibers and wherein the third layer is positioned upstream of the second layer, and the second layer is positioned upstream of the first layer.

21. The filter media of claim 1, wherein the third layer comprises meltblown fibers, meltspun fibers, centrifugal spun fibers, or electrospun fibers and wherein the third layer is positioned upstream of the first and second layers and the second layer is wherein the third layer is positioned upstream of the first and second layers.

22. The filter media of claim 1, wherein the third layer is positioned upstream of the first and second layers and the first layer is positioned upstream of the second layer.

* * * * *